United States Patent
Moloney-Egnatios et al.

(10) Patent No.: US 12,174,886 B1
(45) Date of Patent: Dec. 24, 2024

(54) INTERFACES AND TECHNIQUES FOR AUDIO CONTENT ACCESS AND PLAYBACK

(71) Applicant: Sonos, Inc., Santa Barbara, CA (US)

(72) Inventors: Kate Moloney-Egnatios, Los Altos, CA (US); Ron Kuper, Arlington, MA (US); Jerry Anderson, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/537,581

(22) Filed: Dec. 12, 2023

Related U.S. Application Data

(63) Continuation of application No. 16/045,501, filed on Jul. 25, 2018, now abandoned, which is a continuation of application No. 13/554,214, filed on Jul. 20, 2012, now abandoned.

(60) Provisional application No. 61/509,939, filed on Jul. 20, 2011.

(51) Int. Cl.
| | |
|---|---|
| H04L 9/32 | (2006.01) |
| G06F 16/638 | (2019.01) |
| G06F 16/64 | (2019.01) |
| H04L 9/40 | (2022.01) |

(52) U.S. Cl.
CPC ............ *G06F 16/638* (2019.01); *G06F 16/64* (2019.01); *H04L 9/32* (2013.01); *H04L 63/0807* (2013.01)

(58) Field of Classification Search
CPC ......... G06F 16/638; G06F 16/64; H04L 9/32; H04L 63/0807
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |

(Continued)

FOREIGN PATENT DOCUMENTS

| | | |
|---|---|---|
| EP | 1389853 A1 | 2/2004 |
| JP | 2002162974 A | 6/2002 |

(Continued)

OTHER PUBLICATIONS

Advisory Action mailed on Mar. 23, 2016, issued in connection with U.S. Appl. No. 13/554,214, filed Jun. 20, 2012, 3 pages.

(Continued)

*Primary Examiner* — Sanchita Roy

(57) ABSTRACT

A controller device is configured to (1) transmit, to a first remote computing device associated with a first music service, a request for a session token that is to be used for identifying an audio playback system with the first music service, (2) receive a first token for authenticating communications from the audio playback system to the first music service, (3) receive first user input indicating a query, (4) transmit a request comprising the first token to the first remote computing device to perform a search in accordance with the query, (5) present indications of music content provided by the first music service, (6) receive second user input indicating selection of given music content provided by the first music service, and (6) based on the second user input and a respective identifier for the given music content, cause at least one playback device to play back the given music content.

21 Claims, 20 Drawing Sheets

(56) References Cited

U.S. PATENT DOCUMENTS

| | | | |
|---|---|---|---|
| 6,032,202 | A | 2/2000 | Lea et al. |
| 6,073,125 | A | 6/2000 | Cordery et al. |
| 6,256,554 | B1 | 7/2001 | DiLorenzo |
| 6,336,217 | B1 | 1/2002 | D'Anjou et al. |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,587,127 | B1 | 7/2003 | Leeke et al. |
| 6,611,537 | B1 | 8/2003 | Edens et al. |
| 6,614,804 | B1 | 9/2003 | McFadden et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,469,291 | B2 | 12/2008 | Hammell et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,788,138 | B2 | 8/2010 | Mehmann et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0054134 | A1 | 5/2002 | Kelts et al. |
| 2002/0124097 | A1 | 9/2002 | Isely et al. |
| 2002/0138226 | A1 | 9/2002 | Doane |
| 2003/0157951 | A1 | 8/2003 | Hasty, Jr. |
| 2004/0024478 | A1 | 2/2004 | Hans et al. |
| 2004/0117759 | A1 | 6/2004 | Rippert et al. |
| 2006/0149850 | A1* | 7/2006 | Bowman ............... G11B 27/10 709/205 |
| 2006/0168569 | A1 | 7/2006 | Smith et al. |
| 2007/0142944 | A1 | 6/2007 | Goldberg et al. |
| 2007/0219910 | A1* | 9/2007 | Martinez ............ H04L 63/102 705/51 |
| 2008/0059564 | A1 | 3/2008 | Persson |
| 2008/0141221 | A1 | 6/2008 | Benesovska et al. |
| 2008/0256394 | A1 | 10/2008 | Rashevsky et al. |
| 2009/0103902 | A1 | 4/2009 | Matsuura et al. |
| 2009/0119054 | A1 | 5/2009 | Adachi |
| 2009/0210921 | A1 | 8/2009 | Ramsdell |
| 2010/0031366 | A1 | 2/2010 | Knight et al. |
| 2010/0075313 | A1 | 3/2010 | Kreuwel et al. |
| 2010/0240461 | A1 | 9/2010 | Rasmussen et al. |
| 2010/0241849 | A1* | 9/2010 | Bradley ............ H04L 63/0281 713/153 |
| 2014/0189648 | A1 | 7/2014 | Everitt |

FOREIGN PATENT DOCUMENTS

| | | |
|---|---|---|
| JP | 2003162479 A | 6/2003 |
| JP | 2005115509 A | 4/2005 |
| JP | 2009515256 | 4/2009 |
| JP | 2011054176 A | 3/2011 |
| JP | 2011126134 A | 6/2011 |
| KR | 20010090215 | 10/2001 |
| KR | 20050051785 | 6/2005 |
| WO | 200153994 | 7/2001 |
| WO | 2003093950 A2 | 11/2003 |
| WO | 2007056144 A2 | 5/2007 |
| WO | 2007111208 A1 | 10/2007 |
| WO | 2011131220 A1 | 10/2011 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Office Action mailed on Jun. 7, 2016, issued in connection with Canadian Patent Application No. 2,842,260, 4 pages.
Canadian Patent Office, Canadian Office Action mailed on Mar. 18, 2019, issued in connection with Canadian Application No. 2842260, 5 pages.
Canadian Patent Office, Office Action mailed on May 10, 2017, issued in connection with Canadian patent application No. 2842260, 3 pages.
Chinese Patent Office, Chinese Office Action mailed on Apr. 15, 2016, issued in connection with Chinese Patent Application No. 201280045583.9, 17 pages.
Chinese Patent Office, Fourth Office Action mailed on Dec. 8, 2017, issued in connection with Chinese Patent Application No. 201280045583.9, 3 pages.
Chinese Patent Office, Office Action mailed on May 3, 2017, issued in connection with Chinese Patent Application No. 201280045583.9, 15 pages.
Chinese Patent Office, Second Office Action mailed on Nov. 28, 2016, issued in connection with Chinese Patent Application No. 201280045583.9, 16 pages.
Dedhia, S., "Windows 7 Beta 6.1.7000.0 (7000.0.081212-1400) DVD ISO Details Screenshots", Dec. 24, 2008, http://www.blogsdna.com/1763/windows-7-beta-1-6170000-70000081212-1400-dvd-iso-details-screenshots.htm, Blogsdna, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Examination Report mailed on Dec. 4, 2015, issued in connection with European Patent Application No. 12814213.0, 4 pages.
European Patent Office, European Office Action mailed on Nov. 23, 2018, issued in connection with European Application No. 12814213.0, 8 pages.
European Patent Office, Extended Search Report mailed on Feb. 19, 2015, issued in connection with European Patent Application No. 12814213.0, 5 pages.
Final Office Action mailed on Jun. 12, 2023, issued in connection with U.S. Appl. No. 16/045,501, filed Jul. 25, 2023, 17 pages.
Final Office Action mailed on Jan. 15, 2016, issued in connection with U.S. Appl. No. 13/554,214, filed Jun. 20, 2012, 41 pages.
Final Office Action mailed on Jan. 26, 2018, issued in connection with U.S. Appl. No. 13/554,214, filed Jul. 20, 2012, 40 pages.
Final Office Action mailed on Jun. 7, 2022, issued in connection with U.S. Appl. No. 16/045,501, filed Jul. 25, 2018, 16 pages.
International Bureau, International Preliminary Report on Patentability mailed Jan. 30, 2014, issued in connection with International Application No. PCT/US2012/047620, filed on Jul. 20, 2012, 7 pages.
International Searching Authority, International Search Report mailed on Dec. 27, 2012, issued in connection with International Application No. PCT/US2012/047620, filed on Jul. 20, 2011, 3 pages.
International Searching Authority, Written Opinion mailed on Dec. 27, 2012, issued in connection with International Application No. PCT/US2012/047620, filed on Jul. 20, 2011, 5 pages.
Japanese Patent Office, First Office Action mailed on Aug. 30, 2016, issued in connection with JP Application No. 2015-156308, 5 pages.

(56) References Cited

OTHER PUBLICATIONS

Japanese Patent Office, Office Action mailed on Jan. 13, 2015, issued in connection with Japanese Patent Application No. 2014-521830, 7 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Apr. 11, 2024, issued in connection with U.S. Appl. No. 18/537,581, filed Dec. 12, 2023, 14 pages.
Non-Final Office Action mailed on Jun. 16, 2017, issued in connection with U.S. Appl. No. 13/554,214, filed Jul. 20, 2012, 37 pages.
Non-Final Office Action mailed on Jan. 17, 2023, issued in connection with U.S. Appl. No. 16/045,501, filed Jul. 25, 2018, 14 pages.
Non-Final Office Action mailed on Jan. 19, 2022, issued in connection with U.S. Appl. No. 16/045,501, filed Jul. 25, 2018, 12 pages.
Non-Final Office Action mailed on Jun. 26, 2015, issued in connection with U.S. Appl. No. 13/554,214, filed Jun. 20, 2012, 23 pages.
Palm, Inc., "Handbook for the Palm VII Handheld," May 2000, 311 pages.
Presentations at WinHEC 2000, May 2000, 138 pages.
Restriction Requirement mailed on Oct. 6, 2020, issued in connection with U.S. Appl. No. 16/045,501, filed Jul. 25, 2018, 8 pages.
STAF, "Design and Implementation of Distributed Automation Software Testing System Based on STAF", 2011, 29 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

| | Performance Rating | User Rating | Known Issues |
|---|---|---|---|
| PANDORA | 🚦 | ☆☆☆☆☆ | None |
| NAPSTER | 🚦 | ☆☆☆ | None |
| SPOTIFY | 🚦 | ☆☆☆☆☆ | Service outage |

FIGURE 13

Content/Device incompatibility leads to
(API/service) X (1 API/device)

Interoperability using Sonos Music API

INTERFACES AND TECHNIQUES FOR AUDIO CONTENT ACCESS AND PLAYBACK

CROSS-REFERENCE TO RELATED APPLICATIONS

This application is related to U.S. patent application Ser. No. 16/045,501, filed on Jul. 25, 2018, and titled "Distributed Computer System Architecture for Networked Playback Systems to Facilitate Producing Music Service Media Applications and to Utilize Music Services," which is a continuation of U.S. patent application Ser. No. 13/554,214, filed on Jul. 20, 2012, and titled "Web-based Music Partner Systems and Methods," which claims priority to U.S. Provisional Patent Application No. 61/509,939, filed on Jul. 20, 2011, and titled "Web-based Music Partner Systems and Methods," the contents of each of which are herein incorporated by reference in their entirety.

FIELD

The presently disclosed technology is directed towards technology for use in the area of consumer electronics. In particular, certain embodiments are directed to facilitating configuration of and access to multimedia content from a variety of content providers.

BACKGROUND

Music is very much a part of our everyday lives. Thanks to the advancement of technology, music content is now more accessible than ever. The same can be said of other types of media, such as television, movies, and other audio and video content. In fact, now a user can even access the content over the Internet through an online store, an Internet radio station, online music service, online movie service, and the like, in addition to the more traditional means of accessing audio and video content.

The demand for such audio and video content continues to surge. Given the high demand over the years, technology used to access and play such content has likewise improved. Even still, technology used in accessing the content and the playback of such content can be significantly improved or developed in ways that the market or end users may not anticipate.

BRIEF DESCRIPTION OF THE DRAWINGS

Features, aspects, and advantages of the presently disclosed technology are better understood with regard to the following description, appended claims, and accompanying drawings where:

FIG. 13 illustrates an example music service performance feedback dashboard.

Figure 1:
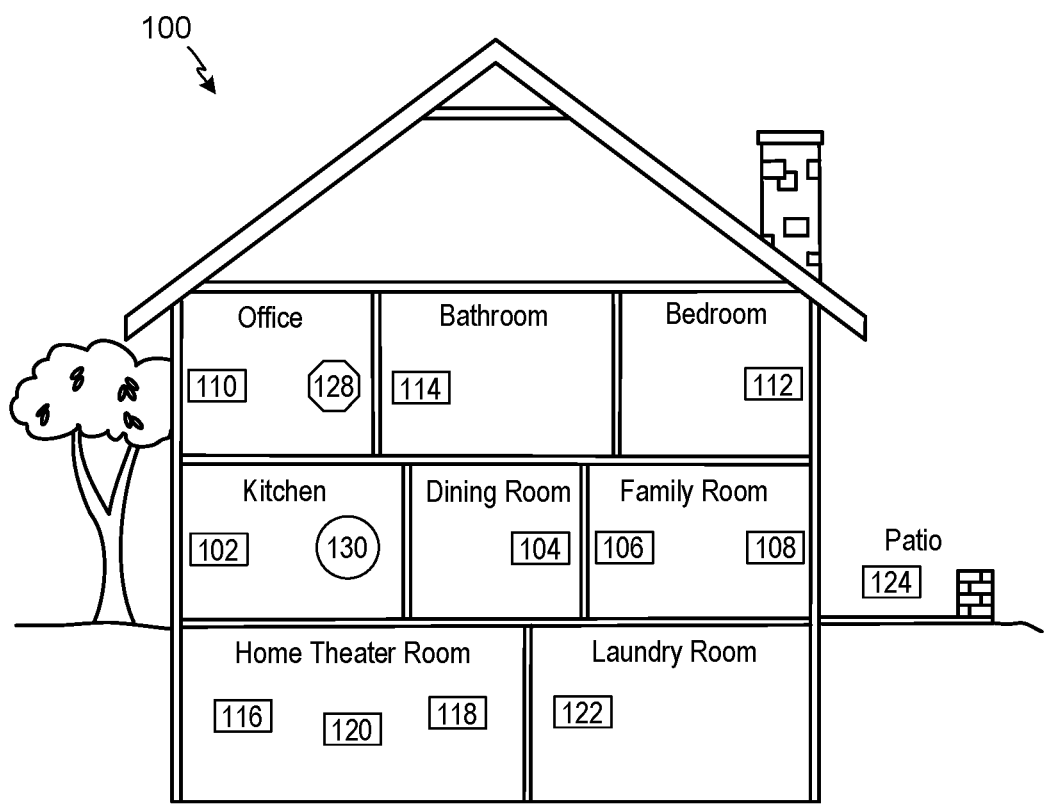
FIG. 1 shows an example configuration in which certain embodiments may be practiced.

In addition, the drawings are for the purpose of illustrating certain embodiments, but it is understood that the inventions are not limited to the arrangements and instrumentality shown in the drawings.

DETAILED DESCRIPTION

I. Overview

Example embodiments described herein relate to integration between new partner content services and a content access and playback system. The embodiments are particularly useful to partner content services, such as media providers, as a simpler mechanism and process to provide digital media from more remote media sources over the cloud to high fidelity playback systems. In some instances, certain embodiments enable content services to make themselves available via the cloud to connected playback systems about sixty percent faster than before. In some instances, certain embodiments give users of playback systems early access to the content service during the development and testing phases. Additionally, the embodiments are particularly useful when used in conjunction with a playback device, as certain embodiments described herein are configured to deliver more access to audio over the cloud that can be positioned in various ways. The embodiments may also find utility, for example, in connection with any environment and system for which flexibility in developing, testing, validating, and deploying a variety of media content is desired.

Although the following discloses example methods, apparatus, systems, and articles of manufacture including, among other components, firmware and/or software executed on hardware, it should be noted that such methods, apparatus, systems, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

These embodiments and many additional embodiments are described more below. Further, the detailed description is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present invention may be practiced without certain, specific details. In other instances, well known methods, procedures, components, and circuitry have not been described in detail to avoid unnecessarily obscuring aspects of the embodiments.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, may be combined with other embodiments.

II. Example Environment

Referring now to the drawings, in which like numerals may refer to like parts throughout the figures. FIG. 1 shows an example system configuration 100 in which one or more embodiments described and disclosed herein may be practiced.

By way of illustration, the system configuration 100 represents a home with multiple zones, though the home could have been configured with only one zone. Each zone, for example, represents a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the system configuration 100. Controller 130 may be fixed to a zone, or alternatively, mobile such that it can be moved about the zones. System 100 may also include more than one controller 130. The system configuration 100 illustrates an example whole house audio system, though it is understood that the technology described herein is not limited to its particular place of application or to an expansive system like a whole house audio system 100 of FIG. 1.

a. Example Zone Players

Figure 2A:
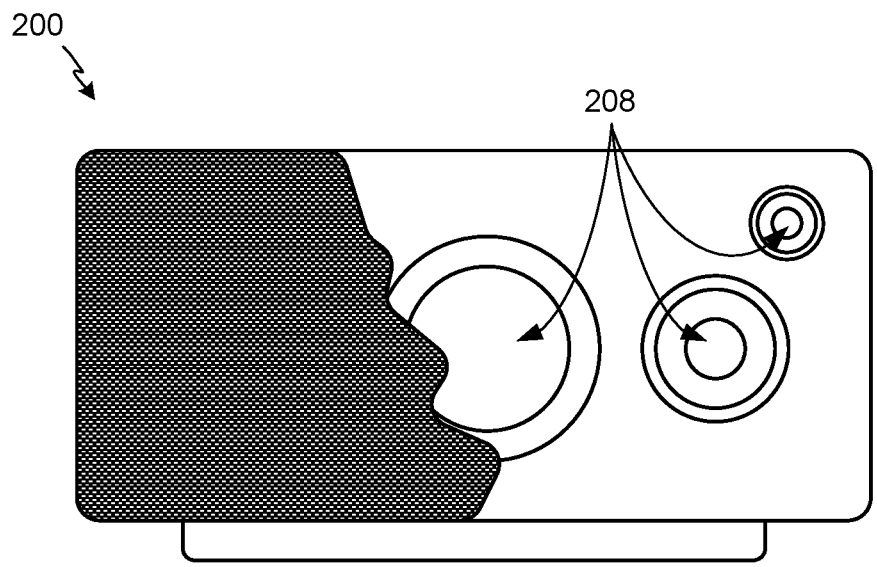
FIG. 2A shows an illustration of an example zone player having a built-in amplifier and speakers.
Figure 2B:
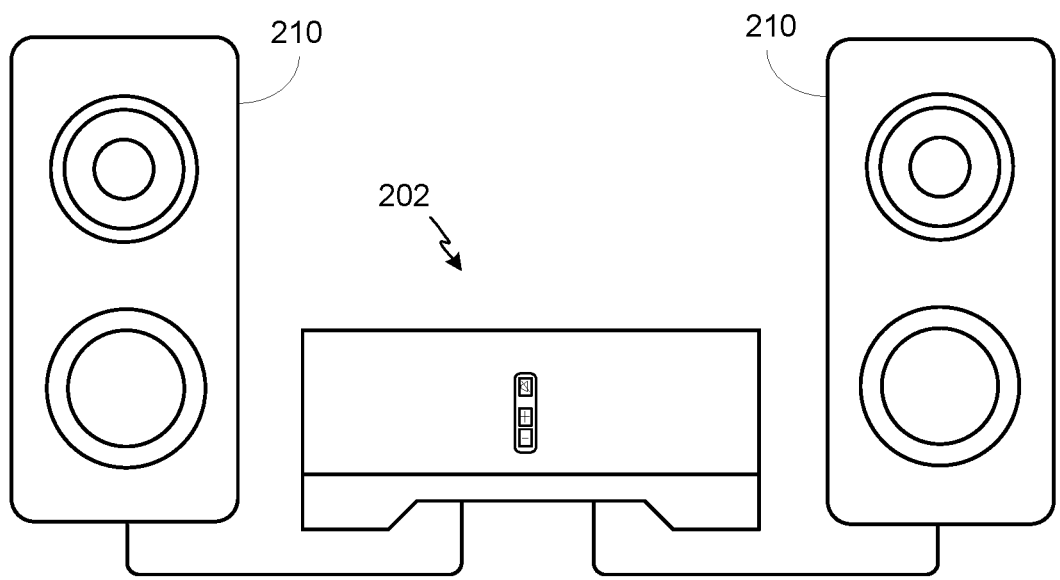
FIG. 2B shows an illustration of an example zone player having a built-in amplifier and connected to external speakers.
Figure 2C:
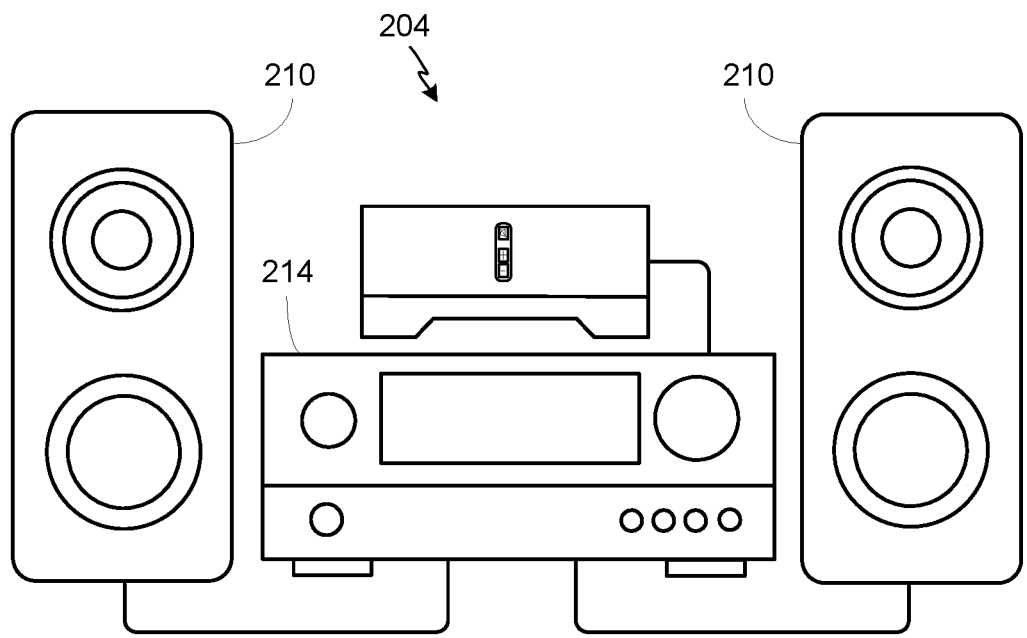
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, California presently offers for sale zone players referred to as a "PLAY: 5," "PLAY: 3," "CONNECT: AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
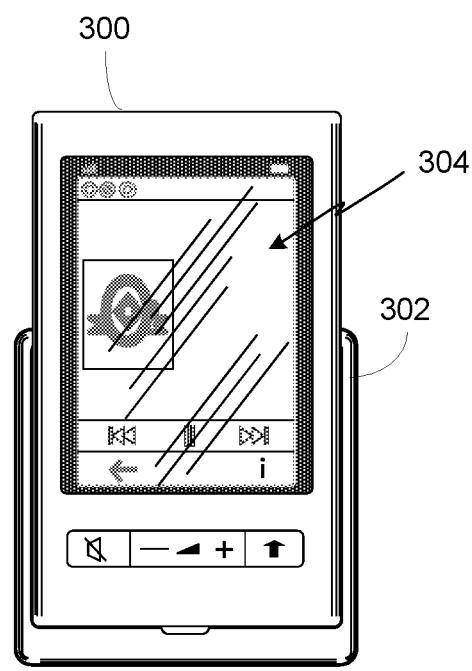
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or MAC™ can also be used as controller 130. Such controllers may connect to system 100 through an interface with data network 128, a zone player, a wireless router, or using some other configured connection path. Example controllers offered by Sonos, Inc. of Santa Barbara, California include a "Controller 200," "SONOS® CONTROL," "SONOS® Controller for IPHONE™," "SONOS® Controller for IPAD™," "SONOS®) Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

c. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
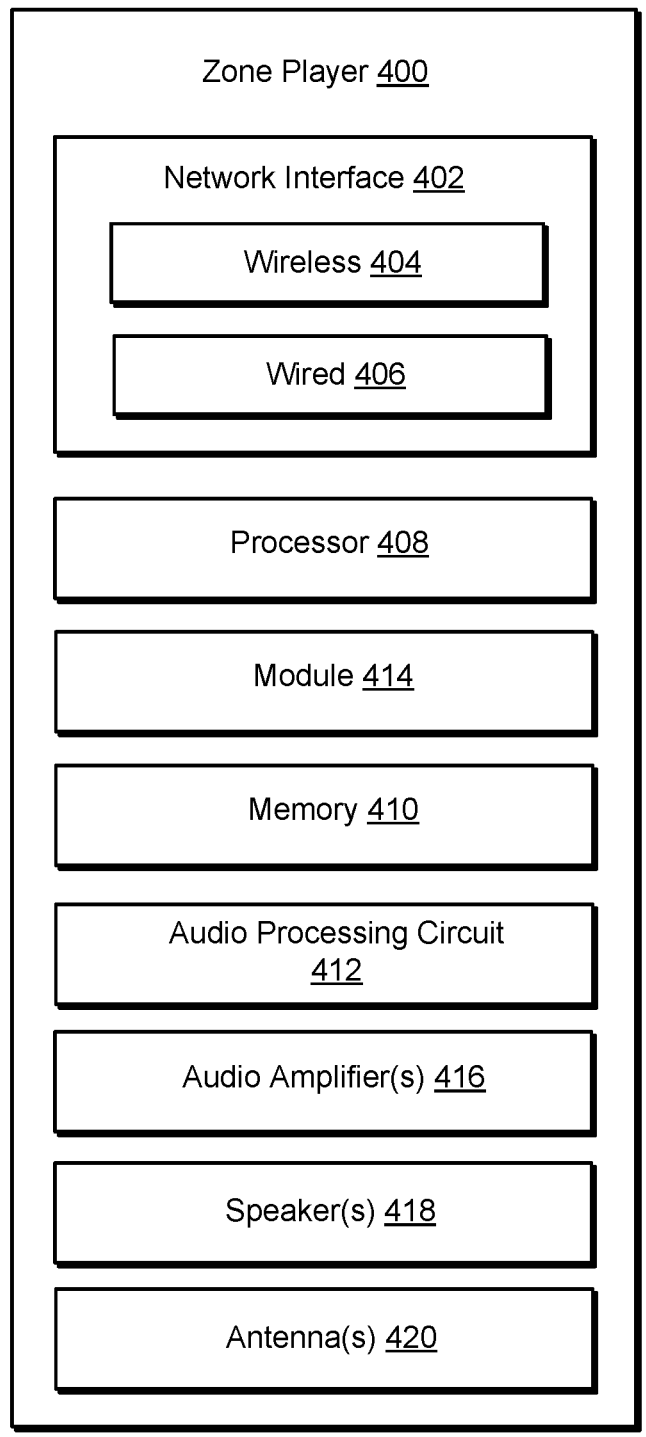
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY: 5, is a zone player with a built-in amplifier and speakers that is capable of retrieving audio directly from the source, such as on the Internet or on the local network, for example. In particular, the PLAY: 5 is a five-amp, five-driver speaker system that includes two tweeters, two mid-range drivers, and one woofer. When playing audio content via the PLAY: 5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY: 5.

IV. Example Controller

Figure 5:
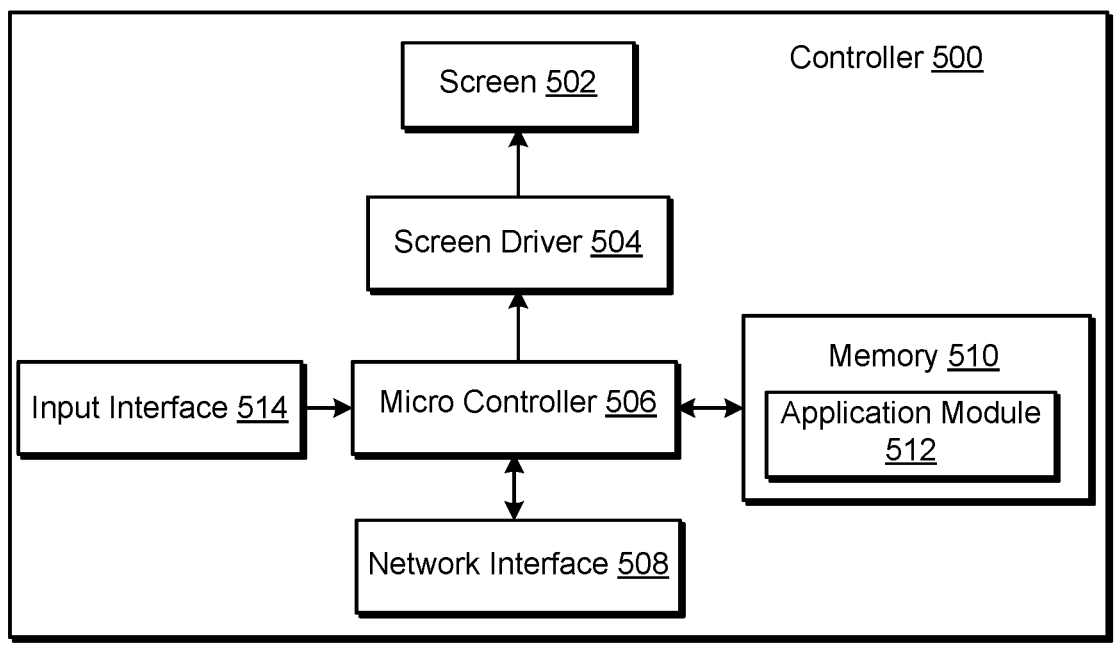
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standard including IEEE 802.11a, 802.11b 802.11g, 802.11n, or 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®. IPAD® or any other smart phone or network-enabled device (e.g., a networked computer such as a PC or MAC®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user must manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Decentralized Synchrony Groups

In certain embodiments, one or more playback devices operate in a decentralized network to facilitate one or more synchrony groups with one or more interchangeable master-slave relationships. Using a decentralized network, communication, and control model, a playback device may provide content to another playback device even if the first playback device is not outputting that content for a listener. Additionally, a playback device may serve as a master device or control at one point in time and may receive instructions (e.g., content and/or synchronization) from another device serving as a master device at another point in time.

Figure 6:
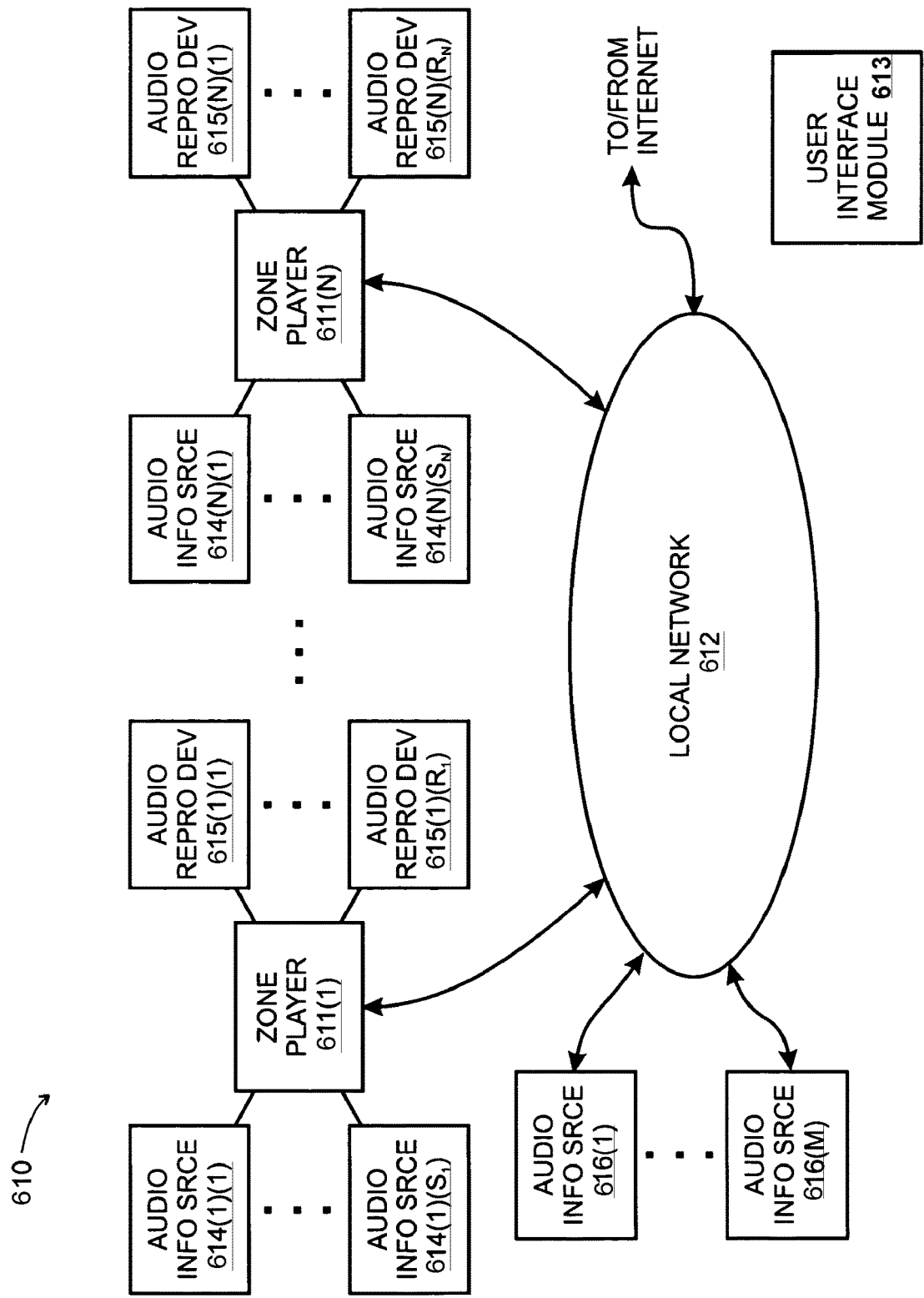
FIG. 6 depicts an illustrative network audio system operating in accordance with a decentralized communication, organization, and control structure.

FIG. 6 depicts an illustrative network audio system 610 operating in accordance with a decentralized communication, organization, and control structure. With reference to the example of FIG. 6, the network audio system 610 includes a plurality of zone players 611(1) through 611(N) (generally identified by reference numeral 611 ($n$)) interconnected by a local network 612, all of which operate under control of one or more user interface modules generally identified by reference numeral 613. The zone players 611 ($n$) may be the same or similar to the playback device(s) described above. One or more of the zone players 611 ($n$) may also be connected to one or more audio information sources, which will generally be identified herein by reference numeral 614 ($n$) (s), and/or one or more audio reproduction devices, which will generally be identified by reference numeral 615 ($n$) (r). In the reference numeral 614 ($n$) (s), index "n" refers to the index "n" of the zone player 611 ($n$) to which the audio information source is connected, and the index "s" (s=1, ..., Sn) refers to the "s-th" audio information source connected to that "n-th" zone player 611 ($n$). Thus, if, for example, a zone player 611 ($n$) is connected to four audio information sources 614 ($n$) (1) through 614 ($n$) (4), the audio information sources may be generally identified by reference numeral 614 ($n$) (s), with Sn=4. It will be appreciated that the number of audio information sources Sn may vary among the various zone players 611 ($n$), and some zone players may not have any audio information sources connected thereto.

Similarly, in the reference numeral 615 ($n$) (r), index "n" refers to the index "n" of the zone player 611 ($n$) to which the audio reproduction device is connected, and the index "r" (r=1, ..., Rn) refers to the "r-th" audio information source connected to that "n-th" zone player 611 ($n$). In addition to the audio information sources 614 ($n$) (s), the network audio system 610 may include one or more audio information sources 616(1) through 616(M) connected through appropriate network interface devices (not separately shown) to the local network 612. Furthermore, the local network 612 may include one or more network interface devices (also not separately shown) that are configured to connect the local network 612 to other networks, including a wide area network such as the Internet, the public switched telephony network (PSTN) or other networks, over which connections to audio information sources may be established.

The zone players 611 ($n$) associated with system 610 may be distributed throughout an establishment such as residence, an office complex, a hotel, a conference hall, an amphitheater or auditorium, or other types of establishments. For example, if the zone players 611 ($n$) and their associated audio information source(s) and/or audio reproduction device(s) are distributed throughout a residence, one may be located in a living room, another may be located in a kitchen, another may be located in a dining room, and yet others may be located in respective bedrooms, to selectively provide entertainment in those rooms.

On the other hand, if the zone players 611 ($n$) and their associated audio information source(s) and/or audio reproduction device(s) are distributed throughout an office complex, one may, for example, be provided in each office to selectively provide entertainment to the employees in the respective offices. Similarly, if the zone players 611 ($n$) and associated audio information source(s) and/or audio reproduction device(s) are used in a hotel, they may be distributed throughout the rooms to provide entertainment to the guests. Similar arrangements may be used with zone players 611 ($n$) and associated audio information source(s) and/or audio reproduction device(s) used in an amphitheater or auditorium. Other arrangements in other types of environments will be apparent to those skilled in the art. In each case, the zone players 611 ($n$) may be used to selectively provide entertainment in the respective locations, for example.

The audio information sources 614 ($n$) (s) and 616(m) may be any of a number of types of conventional sources of audio information, including, for example, compact disc (CD) players, AM and/or FM radio receivers, analog or digital tape cassette players, analog record turntables, and the like. In addition, the audio information sources 614 ($n$) (s) and 616(m) may comprise digital audio files stored locally on, for example, personal computers (PCs), personal digital assistants (PDAs), or similar devices capable of storing digital information in volatile or non-volatile form. As noted above, the local network 612 may also have an interface to a wide area network, over which the network audio system 610 may obtain audio information. Moreover, one or more of the audio information sources 614 ($n$) (s) may also include an interface to a wide area network such as the Internet, the public switched telephony network (PSTN), or any other source of audio information. In addition, one or more of the audio information sources 614 ($n$) (s) and 616(m) may include interfaces to radio services delivered over, for example, satellite. Audio information obtained over the wide area network may include, for example, streaming digital audio information such as Internet radio, digital audio files stored on servers, and other types of audio information and sources.

Generally, the audio information sources 614 (*n*) (s) and 616(m) provide audio information associated with audio programs to the zone players for playback. A zone player that receives audio information from an audio information source 614 (*n*) (s) that is connected thereto may provide playback and/or forward the audio information, along with playback timing information, over the local network 612 to other zone players for playback. Similarly, each audio information source 616(m) that is not directly connected to a zone player may transmit audio information over the network 612 to any zone player 611 (*n*) for playback.

In addition, the respective zone player 611 (*n*) may transmit the audio information that it receives either from an audio information source 614 (*n*) (s) connected thereto, or from an audio information source 616(m), to selected ones of the other zone players 611 (n'), 611 (n"), . . . (n not equal to n', n", . . . ) for playback by those other zone players. The other zone players 611 (n'), 611 (n"), . . . to which the zone player 611 (*n*) transmits the audio information for playback may be selected by a user using the user interface module 613. In that operation, the zone player 611 (*n*) transmits the audio information to the selected zone players 611 (n'), 611 (n"), . . . over the network 612. The zone players 611 (*n*), 611 (n'), 611 (n"), . . . operate such that the zone players 611 (n'), 611 (n"), . . . synchronize their playback of the audio program with the playback by the zone player 611 (*n*), so that the zone players 611 (*n*), 611 (n'), 611 (n") provide the same audio program at the same time.

Users, using user interface module 613, may also enable different groupings or sets of zone players to provide audio playback of different audio programs synchronously. For example, a user, using a user interface module 613, may enable zone players 611(1) and 611(2) to play one audio program, audio information for which may be provided by, for example, one audio information source 614(1) (1). The same or a different user may, using the same or a different user interface module 613, enable zone players 611(4) and 611(5) to contemporaneously play another audio program, audio information for which may be provided by a second audio information source, such as audio information source 614(5) (2). Further, a user may enable zone player 611(3) to contemporaneously play yet another audio program, audio information for which may be provided by yet another audio information source, such as audio information source 616 (1). As yet another possibility, a user may contemporaneously enable zone player 611(1) to provide audio information from an audio information source connected thereto, such as audio information source 614(1) (2), to another zone player, such as zone player 611(6) for playback.

In the following, the term "synchrony group" is used to refer to a set of one or more zone players that are to play the same audio program synchronously. Thus, in the above example, zone players 611(1) and 611(2) comprise one synchrony group, zone player 611(3) comprises a second synchrony group, zone players 611(4) and 611(5) comprise a third synchrony group, and zone player 611(6) comprises yet a fourth synchrony group. Thus, while zone players 611(1) and 611(2) are playing the same audio program, the zones players 611(1) and 611(2) play the audio program synchronously. Similarly, while zone players 611(4) and 611(5) are playing the same audio program, zone players 611(4) and 611(5) play the audio program synchronously. On the other hand, zone players that are playing different audio programs may do so with unrelated timings. That is, for example, the timing with which zone players 611(1) and 611(2) play their audio program may have no relationship to the timing with which zone player 611(3), zone players 611(4) and 611(5), and zone player 611(6) play their audio programs. It will be appreciated that, since "synchrony group" is used to refer to sets of zone players that are playing the same audio program synchronously, zone player 611(1) is not part of zone player 611(6)'s synchrony group, even though zone player 611(1) is providing the audio information for the audio program to zone player 611(6).

In the network audio system 610, the synchrony groups are not fixed. Users may enable them to be established and modified dynamically. Continuing with the above example, a user may enable the zone player 611(1) to begin providing playback of the audio program provided thereto by audio information source 614(1) (1), and subsequently enable zone player 611(2) to join the synchrony group.

Similarly, a user may enable the zone player 611(5) to begin providing playback of the audio program provided thereto by audio information source 614(5) (2), and subsequently enable zone player 611(4) to join that synchrony group. In addition, a user may enable a zone player to leave a synchrony group and possibly join another synchrony group. For example, a user may enable the zone player 611(2) to leave the synchrony group with zone player 611(1), and join the synchrony group with zone player 611(6). As another example, the user may enable the zone player 611(1) to leave the synchrony group with zone player 611(2) and join the synchrony group with zone player 611(6). In connection with this example, the zone player 611(1) may continue providing audio information from the audio information source 614(1) (1) to the zone player 611(2) for playback thereby.

A user, using the user interface module 613, may enable a zone player 611 (*n*) that is currently not a member of a synchrony group to join a synchrony group, after which the zone player 611 (*n*) is enabled to play an audio program that is currently being played by that synchrony group. Similarly, a user, also using the user interface module 613, may enable a zone player 611 (*n*) that is currently a member of one synchrony group to disengage from that synchrony group and join another synchrony group, after which that zone player plays the audio program associated with the other synchrony group.

For example, if a zone player 611(6) is currently not a member of any synchrony group, it, under control of the user interface module 613, may become a member of a synchrony group, after which the zone player plays the audio program being played by the other members of the synchrony group, in synchrony with the other members of the synchrony group. In becoming a member of the synchrony group, zone player 611(6) may notify the zone player that is the master device for the synchrony group that the zone player wishes to become a member of its synchrony group, after which that zone player also transmits audio information associated with the audio program, as well as timing information, to the zone player 611(6). As the zone player 611(6) receives the audio information and the timing information from the master device, the zone player 611(6) plays the audio information with the timing indicated by the timing information, which enables the zone player 611(6) to play the audio program in synchrony with the other zone player(s) in the synchrony group.

Similarly, if a user, using the user interface module 613, enables a zone player 611 (*n*) associated with a synchrony group to disengage from that synchrony group, and, if the zone player 611 (*n*) is not the master device of the synchrony group, the zone player 611 (*n*) may notify the master device, after which the master device may terminate transmission of the audio information and timing information to the zone player lien). If the user also enables the zone player 611 (*n*) to begin playing another audio program using audio information from an audio information source 614 (*n*) (s) connected thereto, it acquires the audio information from the audio information source 614 (*n*) (s) and initiate playback thereof. If the user enables another zone player 611 (n') to join the synchrony group associated with zone player 611 (*n*), operations in connection therewith may proceed as described immediately above.

In another example, if a user, using the user interface module 613, enables a zone player 611 (*n*) associated with a synchrony group to disengage from that synchrony group and join another synchrony group, and, if the zone player is not the master device of the synchrony group from which it is disengaging, the zone player 611 (*n*) may notify the master device of the synchrony group from which it is disengaging, after which that zone player terminates transmission of audio information and timing information to the zone player 611 (*n*) that is disengaging.

Contemporaneously, the zone player 611 (*n*) may notify the master device of the synchrony group that it (that is, zone player 611 (*n*)) is joining, after which the master device may begin transmission of audio information and timing information to that zone player 611 (*n*). The zone player 611 (*n*) may thereafter begin playback of the audio program defined by the audio information, in accordance with the timing information so that the zone player 611 (*n*) plays the audio program in synchrony with the master device.

As another example, a user, using the user interface module 613, may enable a zone player 611 (*n*) that is not associated with a synchrony group, to begin playing an audio program using audio information provided to it by an audio information source 614 (*n*) (s) connected thereto. In that case, the user, also using the user interface module 613 or a user interface device that is specific to the audio information source 614 (*n*) (s), may enable the audio information source 614 (*n*) (s) to provide audio information to the zone player 611 (*n*). After the zone player 611 (*n*) has begun playback, or contemporaneously therewith, the user, using the user interface module 613, may enable other zone players 611 (n'), 611 (n"), . . . to join zone player 611 (*n*)'s synchrony group and enable that zone player 611 (*n*) to transmit audio information and timing information thereto as described above, to facilitate synchronous playback of the audio program by the other zone players 611 (n'), 611 (n") . . . . A user may use the user interface module 613 to control other aspects of the network audio system 10, including but not limited to the selection of the audio information source 614 (*n*) (s) that a particular zone player 611 (*n*) is to utilize, the volume of the audio playback, and so forth. In addition, a user may use the user interface module 613 to turn audio information source(s) 614 (*n*) (s) on and off and to enable them to provide audio information to the respective zone players 611 (*n*).

VI. Example Web-Based Music Partner Systems and Methods

Certain embodiments provide systems and methods for content services to integrate with content access and playback networks. For example, certain embodiments enable a music content provider to integrate a music service with a playback device or a network or group of playback devices (e.g., organized in zones, groups, and so on as described above) without requiring updates or configuration changes to the playback device or the network or group of playback devices. In another example, certain embodiments enable a hardware/software manufacturer of playback devices to provide a simple interface for music content providers to make their content available (e.g., free access or through a paid subscription) to the end-users of the playback devices. As such, someone using a playback device, for example, may casily access new content providers to explore and discover new media content with minimal effort. The technology and business applications are useful in many other ways, such as described and understood from the description herein. Further, the description below is generally directed to music, however, it is understood that the technology may be used for purposes of video and other types of audio.

In certain embodiments, one or more zone players may be organized to play high-fidelity (HiFi) audio with respect to a wired or wireless network (e.g., the SONOS® Wireless HiFi System). Using the network system, a user may access one or more stored music libraries, as well as Internet radio stations, online music services, and so on. Certain embodiments assist a content provider in configuring, developing, testing, certifying, and making available a music service to a playback device and/or a wired or wireless network playback system.

Certain embodiments provide a system to enable a content service access to web services from a central location. Technical details of a partner's content service for integration are entered via a web site, and a setting for one or more servers causes the service to appear in a customer's firmware without any interaction by the customer.

In certain embodiments, content services access a self-service web-based platform to sign agreements, download tools and documents, and certify and register their services to facilitate integration of content services into playback devices and playback networks. In certain examples, the tools include user interfaces (UIs) and application programming interfaces (APIs) to connect the content services with the playback devices. The API (e.g., the SONOS® Music API) may be an open web-services API that provides a consistent way for content to be delivered by web-based music services to the SONOS® and/or other media playback system.

Certain embodiments enable a content provider to leverage web services (e.g., AMAZON™ Web Services or other services in "the cloud"). Certain embodiments provide scalability and low cost to developers, platform/system providers, and end users. Certain embodiments enable on-going "out of band" (e.g., no firmware update) new partner launches.

In certain embodiments, an automated certification process notifies the content services as to where they are in the partner certification process, for example. The content partner has visibility to its status in the process and is guided through the process (i.e., the process is transparent to the partner). The content partner reaches gates or milestones in the process and is instructed what to do next. Using the process, tools, and milestones in a flexible, scalable program, time to launch for new music or other multimedia content may be reduced (e.g., cut in half from a content provider working directly with a hardware/software manufacturer).

In certain embodiments, a content release cycle involves several phases including development or pre-alpha, alpha release (e.g., initial testing and validation), beta release (e.g., usability and functional testing of feature-complete content), and general availability (e.g., release or launch to the general market upon review and validation completion from beta phase). The general availability release is considered to be the "final" stable and bug-free version of the content and/or content delivery service (e.g., Internet radio or streaming service, and so on).

In certain embodiments, the content partner may run its own beta with music listeners and receive feedback using tools and the like. For example, beta self-service tools are provided so that a partner may view real customer feedback and iterate quickly, to create a better customer experience. Through the beta and eventual full content release, partners benefit from web site placement, customer communication, and in-product music menu placement (e.g., via a beta or test area, such as SONOS LABS™, as part of a music content menu, and so on). Certain embodiments provide performance or usage monitoring, or a combination of both performance and usage monitoring, for example.

Using an open beta, the music delivery system may facilitate crowd-sourcing of testing efforts by offering a test playground for music services to demonstrate and iterate in a live environment, in front of real customers (e.g., music listeners and system users). For example, an in-product open beta feature (e.g., "Sonos Labs") may be made available to listeners. Listeners may access the latest music and participate in beta testing. Using the open beta with crowd-sourced testing efforts, issues with content may be identified sooner than with traditional techniques that are largely content provider driven and not exposed to the platform or the listener in advance. Testing may concurrently surface issues across multiple services, for example. An open beta may also serve as a place of quality control. In certain embodiments, a partner must meet certain program-specified performance and quality standards before beta content is made generally available to system users, for example. Thus, for example, a burden of quality is shifted to the partner, and the program drives and enforces certain quality standards that are made known to the partner.

From a music listener's perspective, facilitating easy integration of new content into a library of music available to customers helps to deliver an expanding world of music for their enjoyment. Access to music services may be faster and better facilitated via an open beta, for example. Using the platform and process, content integration may be made easier for music partners and more reliable for customers. Additionally, consumers are becoming more comfortable with the concept of digital content, cloud-based music services, and the overall idea and value in "paying" for access to content/music. Using open beta and eventual general availability of new content, customers may discover, browse, and play an effectively unlimited selection of music via controllers and playback devices described above.

Certain embodiments provide a self-service model for content partners to manage customer feedback. For example, web-based forms may be provided for customer feedback. A discussion forum may be set up for each partner's music service. Via the forum, both customers and partners may view and post feedback. An issue tracking tool (e.g., Bugzilla™) may be used to report errors, flaws, failures, etc., in the service (commonly referred to as "bugs"), for example.

Social media may be leveraged to facilitate and monitor feedback and advertisement, for example. In certain embodiments, custom user experience widgets or features may be used as interaction models for recommendation engines.

In certain embodiments, monitoring and measurement of on-going performance is facilitated via automated, 24×7 monitoring and snapshot dashboard visibility. For example, an on-going quality and performance dashboard may provide a real-time snapshot of a music partner's overall health and availability, based on a variety of real-time alerts and data. One such measurement, for example, is the number of bugs filed against a particular service. Another example measurement is the number of audio dropouts reported. Yet another example measurement is the total number of users using the music service. These measurements may represent a total number of occurrences or the total number of occurrences per twenty-four (24) hour period, for example.

a. Example Configuration

In an embodiment, one or more configuration parameters are provided to the perspective content services to simplify the integration with a playback network. For example, the audio sample rates (e.g., 48 kHz, 44.1 kHz, 32 kHz, 24 kHz, 22.05 kHz, 16 kHz, 11.025 kHz, 8 kHz, and so on), codecs (e.g., WMA using HTTP, WMA using MMS with HTTP-like streaming, WMA using RTSP, HE-AAC, PS and SBR using HTTP, and so on), languages for localization (e.g., English, French, Italian, German, Spanish, Dutch, Japanese, Chinese, Swedish, Danish, Norwegian, and so on), and security (e.g., SSL TLS v1) supported are provided. Unlike many traditional software development programs, in one embodiment, a special developer key is not required to begin the process. Instead, according to an embodiment, what is needed for a content service to begin the process is to have a representative download the Web Services Description Language (WSDL), read the documentation, and implement the web service. This embodiment eliminates, or substantially eliminates, the often lengthy process of certifying a new service or developer before the process begins.

In addition to basic configuration parameters that can be provided to the content services, a description of the playback system architecture is provided. For example, music storage, controller caching, playlist configuration, device limit, and so on can be described. In one example embodiment, the playback devices do not store music locally, but play music that is streamed from content services directly. There may be some amount of internal buffering in RAM on a player, for example, but the buffering is to reduce or avoid music interruptions on an unreliable network. In another embodiment, the controllers cache music metadata, album art (e.g., in jpg or png format), and search results. The amount of data that is cached, for example, varies between controller application platform, and is subject to the amount of RAM present in each device. In another embodiment, the content of a music queue may be saved into a playlist that is stored on the playback system. In one example embodiment, a playlist may contain an encoded identifier the represents the service providing the track, the track's MIME type, and track ID within that service. In another example embodiment, a playlist may contain the actual audio content for each track in the playlist and/or the actual streaming identifier (e.g., uniform resource identifier (URI)) for each track. In yet another embodiment, the maximum number of playback devices in a playback system is provided. For example, in a Sonos system, thirty-two (32) zones, each playing its own stream, are supported.

b. Example Development Guide

In an embodiment, the music services API is based on the Simple Object Access Protocol (SOAP); however if the back-end services of the content provider are based on a different protocol, then the service may act as a mediation layer that maps the back-end protocol to SOAP commands. For example, if the back-end services are based on the Representational State Transfer (REST) protocol, then the API service can be used as a mediation layer that maps SOAP API methods to the REST back-end protocol. In the example system, all SOAP responses should use a common encoding. For example, Unicode Transformation Format-8 (UTF-8) Extensible Markup Language (XML) encoding can be used for most responses, and GNU Zip (GZip) encoding can be used to compress longer responses.

In an embodiment, search results can include thousands of items, and preferably content services are not required to provide all items at once. In one example embodiment, APIs that return collections of items include parameters specifying a starting index and a count. If the count is less than the total number of items, then the playback system can request successive ranges of items to get the entire results.

In an embodiment, a device ID is a unique ID of a playback device in the playback system (e.g., a unique identifier of a zone player in a household). This ID is established once when the playback system is first set up and is not likely to change. In the example system, content services can use this ID to designate a single "instance" of a playback device. This is useful, for example, to count simultaneous "instances" of a user accessing a content service from multiple locations simultaneously. In some situations, music licensing rules include limits on how many tracks can be played simultaneously from the same account. In one example embodiment, the API provides a specific SOAP fault code, DeviceLimit, to identify that a limit is reached on the number of locations simultaneously accessing content from a single user account. If a playback device attempts to start playing a new track, and the service returns DeviceLimit, for example, the player will "blacklist" the service and skip over all tracks in the queue from the service. In one example embodiment, the "blacklist" will be lifted the next time the user attempts to play a track.

In an embodiment, the service provider can choose their own programming language for the music service mediation layer. It is suggested that the language is one that can ingest a WSDL language and generate code. For example, C#, PHP, Ruby and Java can be used.

In an embodiment, there are three ways to implement authentication. In one example embodiment, authentication is anonymous. In this mode, the user does not need to provide any credentials, and the playback system will communicate with the content service without any attempt to login or obtain any kind of token (e.g., session token). In another example, authentication is based on a session ID. In this mode, the playback system will pass the username and password to the content service and expect a session token to be returned to the playback system. For example, the playback system may pass the username and password in the getSesssionId call over a secure protocol such as HTTPS, and a session token is returned. All subsequent calls to the content service from the playback system will include the session token in a custom SOAP header. In this example, sessions may expire using business rules determined by the content service. When the playback system gets a report of an expired session, then the playback system will need to login again before playing content from that content provider. In yet another example, authentication is based on exchanging a username and password with every call to the content service.

In an embodiment, the minimum functionality may be implemented using only a few methods. For example, getSessionId, getMetadata, getMediaMetadata, getStreamingURL, and getLastUpdate may be used to provide basic services. In this example, getSessionID adds the content service to the playback system, including authentication information if necessary. getMetadata is used to allow users to browse music in a container hierarchy. For example, if a user wants to browse music by Artist, Track, Genre, and so on, they would use this method to do so, getMediaMetadata is used by the playback system to get metadata about a particular track or stream. For example, the playback system may call this method passing in a track or stream ID, and the content service may reply with information describing the track or stream. getStreamingURL is used by the playback system to play content from a content service. For example, the track or stream ID can be passed with this method to initiate the streaming content. getLastUpdate is used by the playback device to refresh the content catalog in a timely fashion.

In an embodiment, search functionality can be implemented using the getMetadata method described above and a Search method that accepts a category identifier (e.g., Track, Album, Artist, Playlist, etc.), search term, and pagination parameters and responds with the appropriate results. In the example system, alphabetic scrolling (e.g., "power scroll") can be implemented using the getScrollIndices method.

In an embodiment, skip-limits for programmed radio stations can be supported to address business rules for content providers. In one example embodiment, playback devices play programmed radio stations by fetching small segments of tracks, getting the next segment as the current segment is nearly complete. To prevent a user from skipping tracks, the content provide can return canSkip=false in the trackMetadata that is returned to the playback system.

In an embodiment, a controller (e.g., controller 500) may be enabled to display two lines for track, album, and artist information. In one example embodiment, the controller inspects the itemType of the music containers to determine whether or not a two-line display for the item should be used.

In an embodiment, users can manage a personalized content collection on a content service by implementing three methods: createItem, deleteItem, and getLastUpdate. These methods can be used to set up a custom service descriptor, for example, by checking favorites or adding/removing tracks, albums, and artists as appropriate. A polling interval (e.g., 300 seconds) can be used to make sure the personalized content is up-to-date.

In an embodiment, errors can be reported from the content service to the playback device, and subsequently to the user as necessary, using a set of predefined SOAP error codes to indicate error conditions. In addition to a set of standard error codes, for example, the API allows a service to provide customized error conditions for situations where the usual fault codes do not apply.

c. Example Beta Program

In the example system, a Beta program is used to assist in the quality control of new services before they are released to the general population. In one example embodiment, the Beta process lasts between two and four weeks, with a successful exit from Beta being determined by the manufacturer of the playback system (e.g., the determination of a successful Beta is determined by Sonos, Inc. for Sonos playback devices). Some factors that may play a role in the successful exit from Beta include the number of users and active engagement from the Beta pool, the performance of the service during Beta, feedback from Beta participants, and the resolution of open issues. In the example embodiment, all feedback can be viewed on an open Beta feedback website. For example, the open Beta feedback for the Sonos devices can be found at http://publicbeta.sonos.com.

d. Example Process Flow

Figure 7:
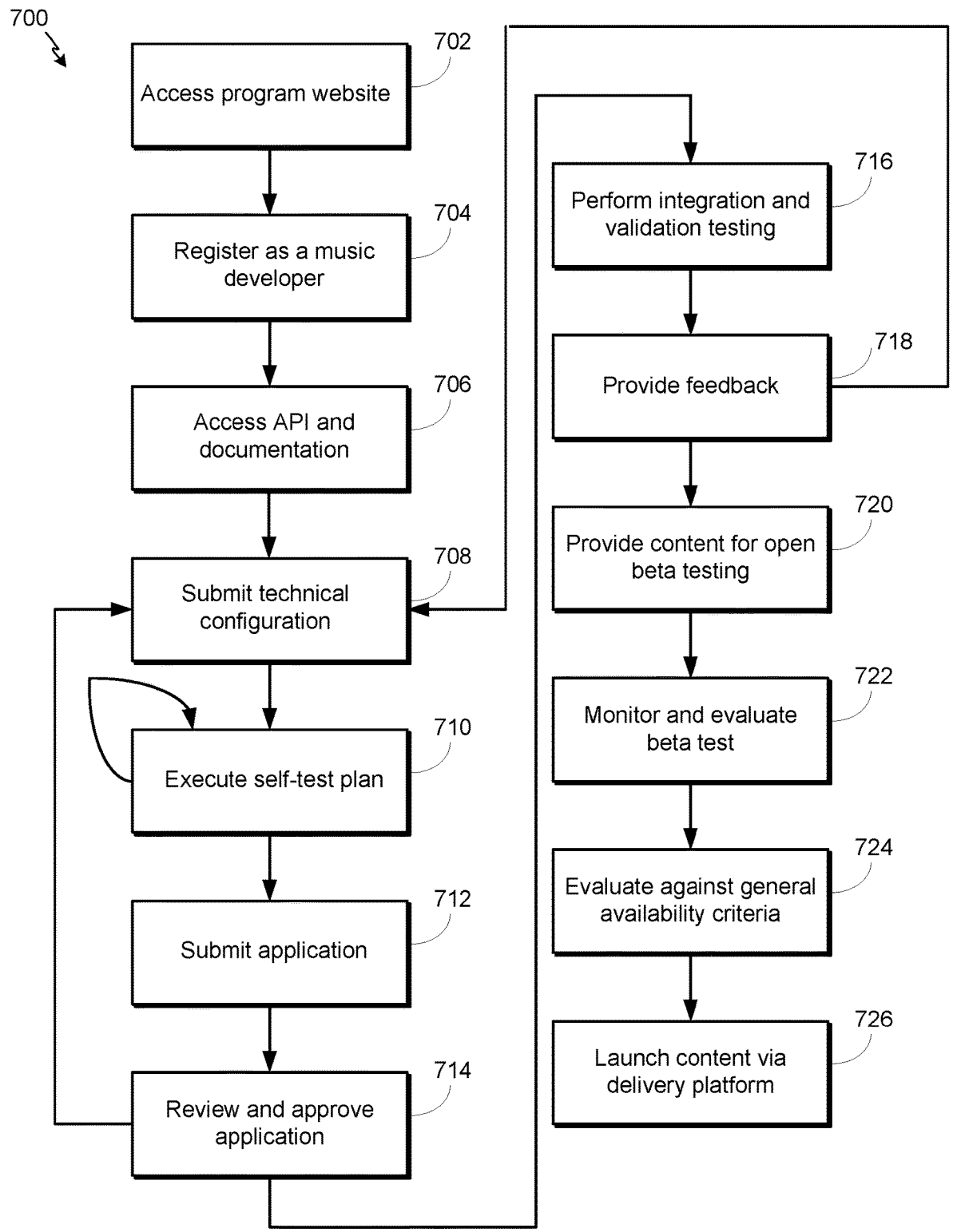
FIG. 7 shows a flow diagram for an example process by which a content partner may access, validate, test, and launch content to users.

FIG. 7 shows a flow diagram 700 for an example process by which a content partner may access, validate, test, and launch content to users. At block 702, a content provider, such as a music content developer, accesses a program website for content validation and integration to a playback platform. At block 704, the provider registers as a music developer. At block 706, after registering, the developer may access one or more platform APIs and technical documentation. The APIs and documentation may be used to allow a content provider to integrate their content (e.g., on demand music, a smart radio station, streaming radio, and so on) with a delivery platform (e.g., a multi-room music system and so on).

At block 708, after using the API and documentation, a technical configuration for the developer's content is submitted to the program. At block 710, a self-test may be executed by the developer to evaluate and test the technical configuration for the developer's content. For example, debugging, performance, and other tools or simulations may be executed with respect to the developer's arrangement of content.

At block 712, following a successful self-test, the developer submits an application for its content to be accepted for beta test. At block 714, the application is reviewed and approved (or sent back for further modification). At block 716, integration and validation testing is performed on approved content via the program (e.g., via automated tools). At block 718, feedback may be provided to the developer whether or not testing results are satisfactory, for example.

At block 720, developer content in the technical configuration is provided for open beta testing to delivery platform users. For example, a new music streaming radio may be provided to SONOS™ users via a SONOS™ Labs beta test menu, accessible via a user's music library viewable through a SONOS™ controller. At block 722, the beta access is monitored and evaluated. For example, user access and interaction with the beta content may be automatically monitored and parameters or metrics may be quantified and stored for program and developer review.

At block 724, results of the open beta are evaluated against general availability criteria. Criteria may be set by the program, industry standard, and so on. Feedback may be provided to the developer to make further modification for consideration against the general availability criteria and before official release. At block 726, after the program and the developer are satisfied, the content is launched for general availability via the delivery platform (e.g., via music library on a SONOS™ controller to a network of zone playback devices).

Figure 8:
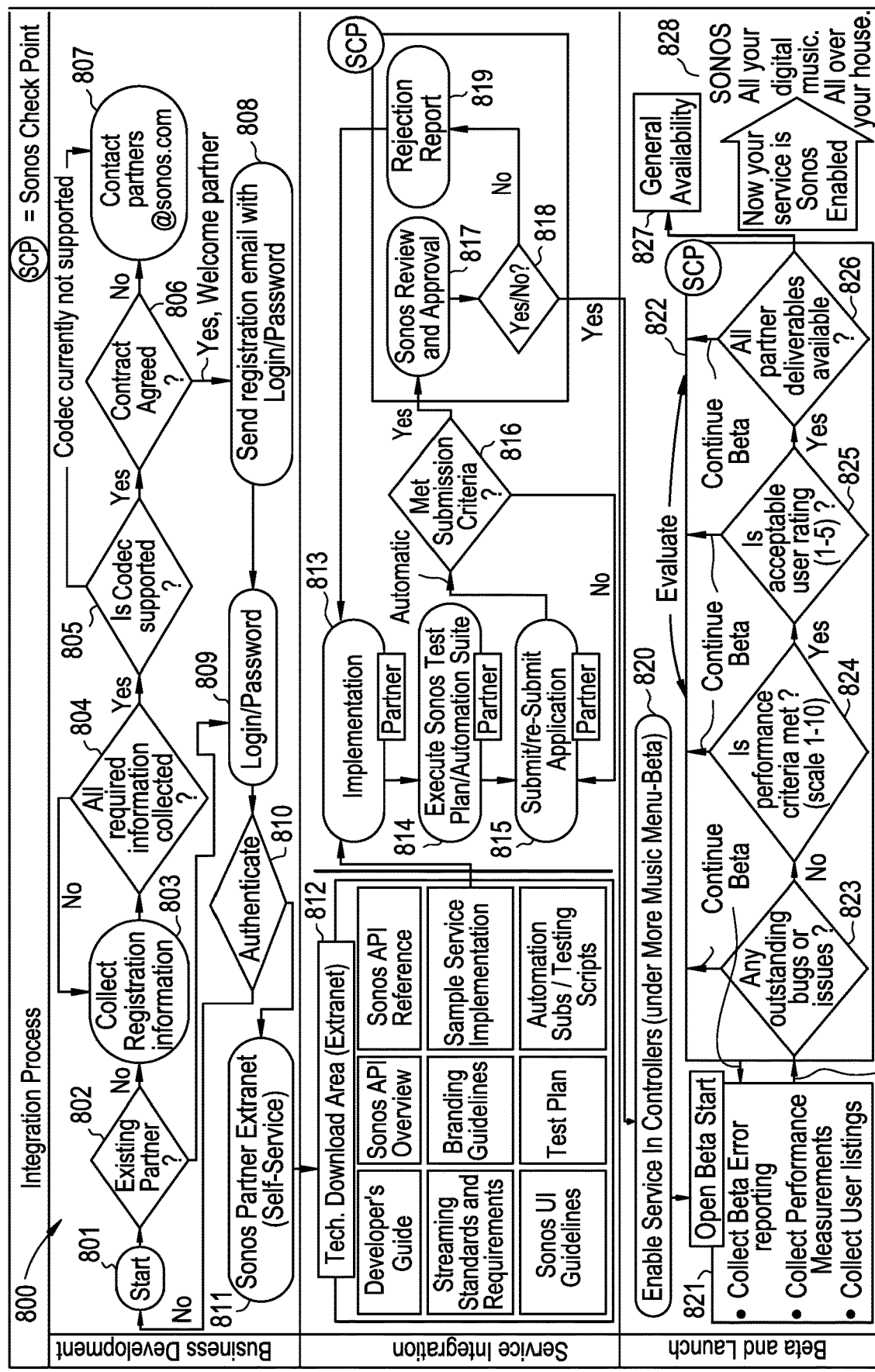
FIG. 8 depicts a flow diagram for an example integration process between a multimedia content developer and a multimedia content platform/service.

FIG. 8 depicts a flow diagram 800 for an example integration process between a multimedia content developer and a multimedia content platform/service. At block 801, the integration process begins (e.g., via a program website access). At block 802, it is determined whether the developer is an existing partner. If not, at block 803, registration information is collected. At block 804, the registration information is evaluated to determine that all required information has been provided. If not, registration information is again requested (block 803). If so, then the developer's codec is checked, at block 805, to determine whether it is supported. A codec is a device or computer program capable of encoding and/or decoding a digital stream or signal, such as a digital audio stream, for example. If yes, then, at block 806, a contract is agreed upon with the developer (e.g., the developer agrees to the program terms). If a contract is not agree or a codec is not supported, at block 807, a program representative is contacted. At block 808, if the contract is accepted, the partner is welcomed. For example, an email with the partner's login and password is sent to the partner.

At block 809, the partner's login and password information are entered (e.g., via a program web site, portal, application interface, and so on). Using these credentials, the partner may login and may return to the website to continue the integration process. At block 810, the login and password information is authenticated. At block 811, the partner tools and development area (e.g., a self-service extranet) are accessed.

At block 812, a download area is provided for the developer. Registered partners may have secure access to the portal, a dedicated website for the partners and developers. This site provides access to a wide variety of documents, technical information, and support resources to help developers succeed in their integration efforts. Some features of the portal include: high-level white papers and getting started information, API reference documentation and integration guides, technical notes and sample code libraries to help solve specific integration tasks, support resources including tips and tricks, frequently asked question guide, trouble-shooting guides, issue tracking, and more. For example, materials such as a developer's guide, API overview, API reference, streaming standards and requirements, branding guidelines, sample service implementation, user interface guidelines, test plan, automation suite, testing scripts, and so on, may be provided for developer access. At block 813, the developer uses these tools and resources to provide an implementation of their content. For example, after downloading technical documentation, partners can start integrating their music service functionality with the platform.

At block 814, a test plan is executed with respect to the implementation. For example, an automation suite may be used to simulate and test the developer's content implementation. In certain examples, after integration is complete, partners may test their services with an actual music system. In certain embodiments, the portal provides partners with a "Self Service and Setup" page to point music player components (e.g., a zone player and a controller) to an end point supporting API Web Services. After configuring their system on the "Self Service and Setup" page, the partner will be able to see their music service in the Music Menu of the Controller. At this point, the music service is visible only to the partner for testing and not available to other users.

After configuring the music service, the partner is to download the test plan, provided by the program, to execute one or more test cases. The partner is expected to execute the complete test plan to make sure all the functionality is performing within specified quality and performance metrics. After successfully testing their music service, the partner can submit its request to enter the Open Beta program.

At block 815, an application for the developer's implementation is submitted (or re-submitted following changes). At block 816, the application is automatically evaluated against program submission criteria.

At block 817, an evaluated and automatically approved application is again reviewed, and, at block 818, either approved or rejected. A partner application goes through a check point for the review and approval process. In certain embodiments, review and approval includes quality assurance (QA) validation, review of screen shots, and review of open beta criteria. If the application is approved, the partner enters Open Beta. At block 819, a rejection report is provided back to the developer for a change in implementation (block 813). For example, if the partner does not meet performance and quality criteria, the application is rejected and an email is sent with the reasons for rejection. After fixing the problems, the partner can re-submit the application for approval. At block 820, an approved application is enabled as a service (e.g., a music service) in open beta (e.g., via a music playback controller).

At block 821, an open beta begins. During the open beta, users may access the service and its content (e.g., in an experimental or beta area, in a regular music area with a beta label, and so on). Error statistics, performance measurements, user ratings, user discussion, other feedback, and so on may be collected and reported, for example. This is designed to allow partners to perform load testing and fine-tune their services while in beta. In-product open beta testing tools may be provided.

In certain embodiments, a beta testing area (e.g., the SONOS SOUND LAB™) enables partners to crowd-source their testing efforts. By offering a test playground for music services to demo and stream their content in a live environment with actual customers, partners may identify usability and performance issues with their service more quickly and reduce overall time-to-market. Customers may access the latest music services by participate participating in the beta testing.

Figure 9A:
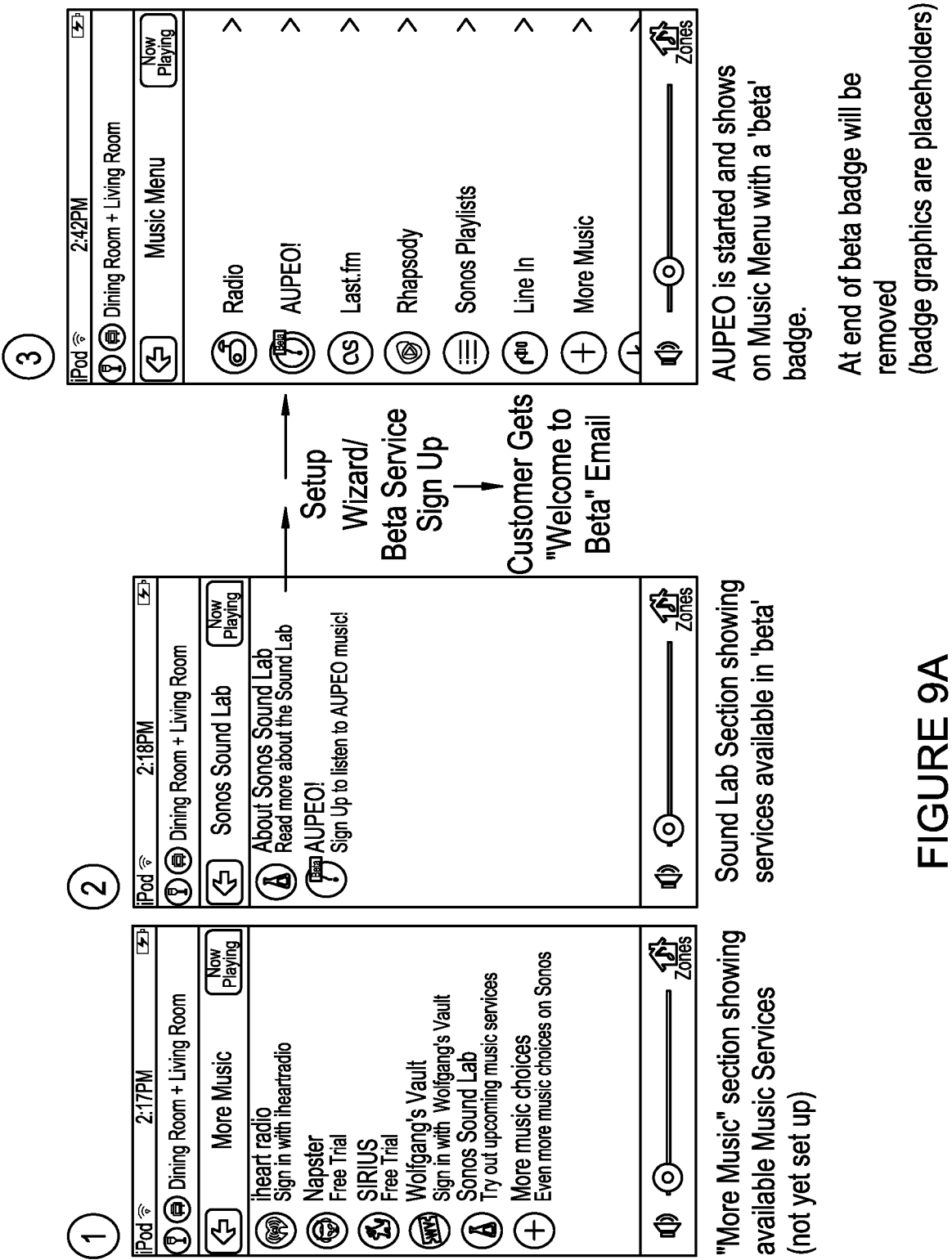
FIGS. 9A-9B depict example controller interfaces to facilitate beta testing and general availability of new content.
Figure 9B:
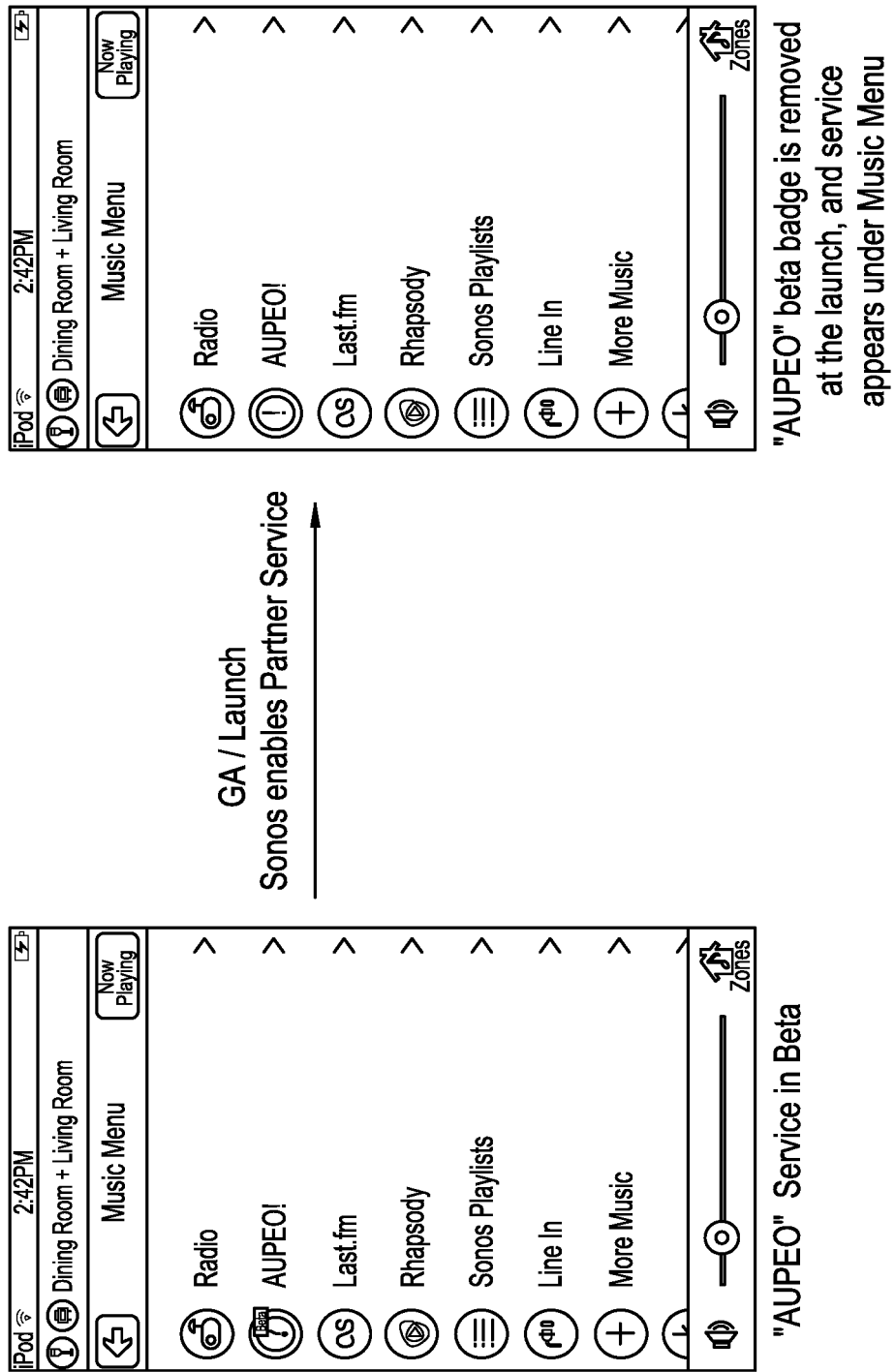

As shown in FIG. 9A, for example, a controller may provide a "More Music" menu 920, in which a list of beta services available to customers is shown. Once the service is selected by the customer using a simple setup wizard, it will appear under the "Music Menu" 930. To differentiate beta services from those already generally available, the music service logo is tagged with a "beta" badge 920, for example. As illustrated in the example of FIG. 9B, the "beta" badge may be removed at the end of beta testing.

At block 822, open beta evaluation occurs. For example, an evaluation of whether the open beta is ready for general availability is performed. During beta testing, customers test the service, provide feedback and submit any bugs they may find. The partners and developers portal gives partners access to forums and issue tracking software to monitor feedback and resolve any issues users are experiencing. At block 823, outstanding bugs or issues are identified. If yes, beta testing continues. If no, at block 824, performance criteria are evaluated (e.g., on a scale from one to ten). At this stage, the partner service goes through another checkpoint to track any outstanding issues, to monitor performance and to ensure all partner deliverables are ready for the general availability of the service. After a period of beta testing, if the service is performing within the specified performance guidelines and there are no outstanding issues, beta testing ends and the service is enabled for general availability (GA). If the performance criteria have not been met, then beta testing continues. If the criteria have been met, then, at block 825, user ratings are evaluated for acceptability (e.g., on a scale from one to five). If not, then beta testing continues. If yes, then, at block 826, partner deliverables are checked for availability. If no, then beta testing continues. If yes, then, at block 827, the content/service is provided to users with general availability via a content delivery platform 828. As shown in FIG. 9B, the beta badge is removed upon GA launch and the service appears under in the Music Menu on the controller.

Figure 10:
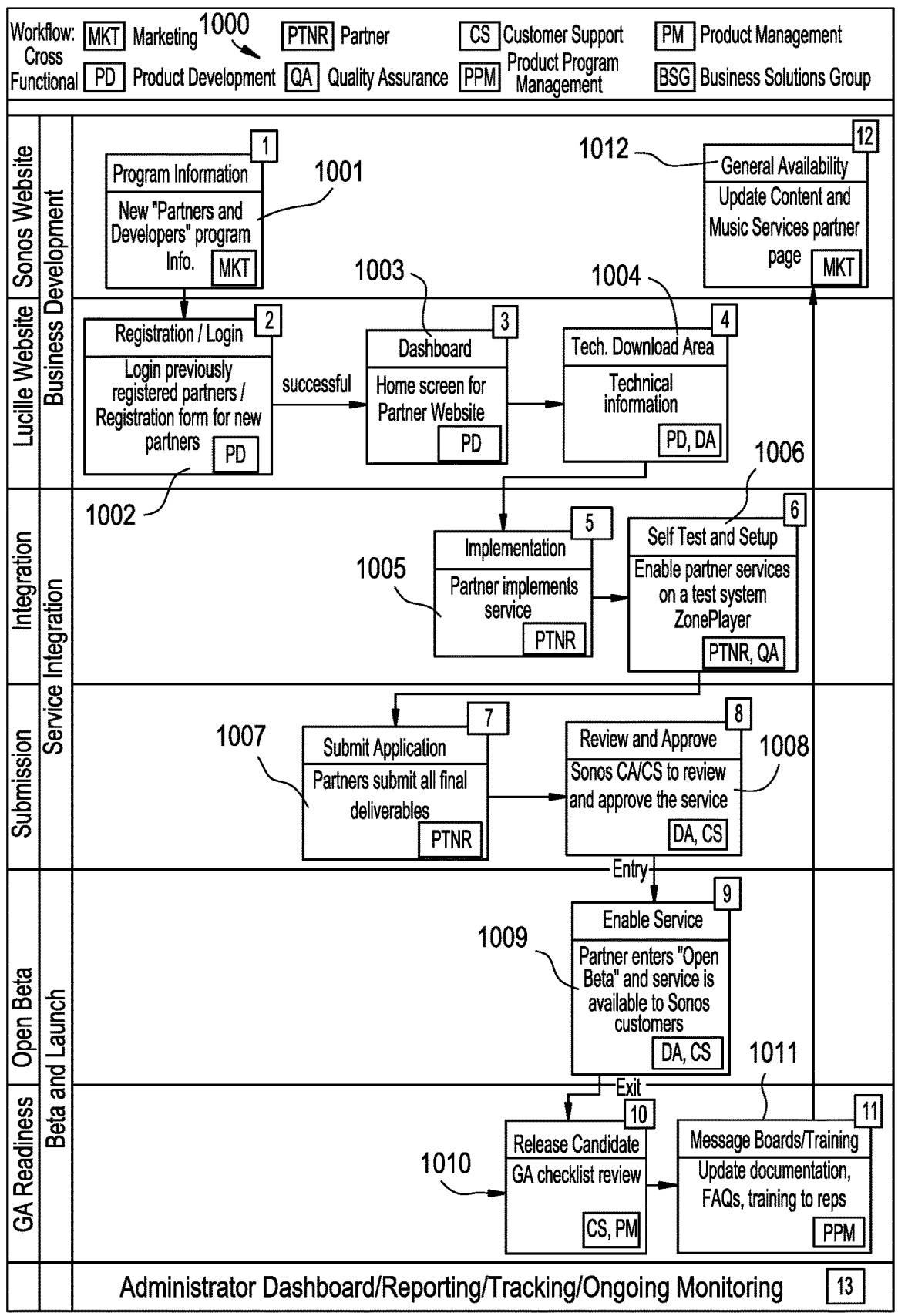
FIG. 10 illustrates a flow diagram for an example cross-functional workflow for development, integration, beta, and launch of new content services.

FIG. 10 illustrates a flow diagram 1000 for an example cross-functional workflow for development, integration, beta, and launch of new content services. At block 1001, program information is provided. For example, information for new partners and developers regarding the integration program is provided via a website or other portal. At block 1002, registration information is obtained from a new partner and login information is provided by newly registered and previously registered partners.

At block 1003, a partner dashboard or "home screen" is provided via a partner website or other portal. At block 1004, via the provider portal, a technical resources download area may be accessed. Technical information, API resources, or other tools may be accessed by a registered partner, for example.

At block 1005, the partner implements a desired content (e.g., digital audio) service. At block 1006, partner service(s) may be enabled for testing on a provided test system for partner self-test. At block 1007, after self-testing has been completed, an application is submitted to the program for the service(s). As part of the application, the partner submits all final deliverables for an implemented service.

At block 1008, the application for service is reviewed for quality, compliance, and so on. Assuming criteria are met, the application is approved. Otherwise, the application is sent back for further development and testing.

At block 1009, an approved service is enabled for beta testing. For example, the service is provided for open beta and made available to customers for use and review. The service is monitored and evaluated automatically and by user feedback during beta testing, for example. Feedback is provided to the developer for consideration and possible modification, for example.

At block 1010, a general availability checklist is reviewed, and a service candidate satisfying the criteria is released. At block 1011, documentation, frequently asked questions (FAQs), training, and so on are updated for general release via the content platform. At block 1012, the service is made generally available outside the beta. Content and music services may be updated on a controller or other interface based on the newly available service, for example.

Figure 11:
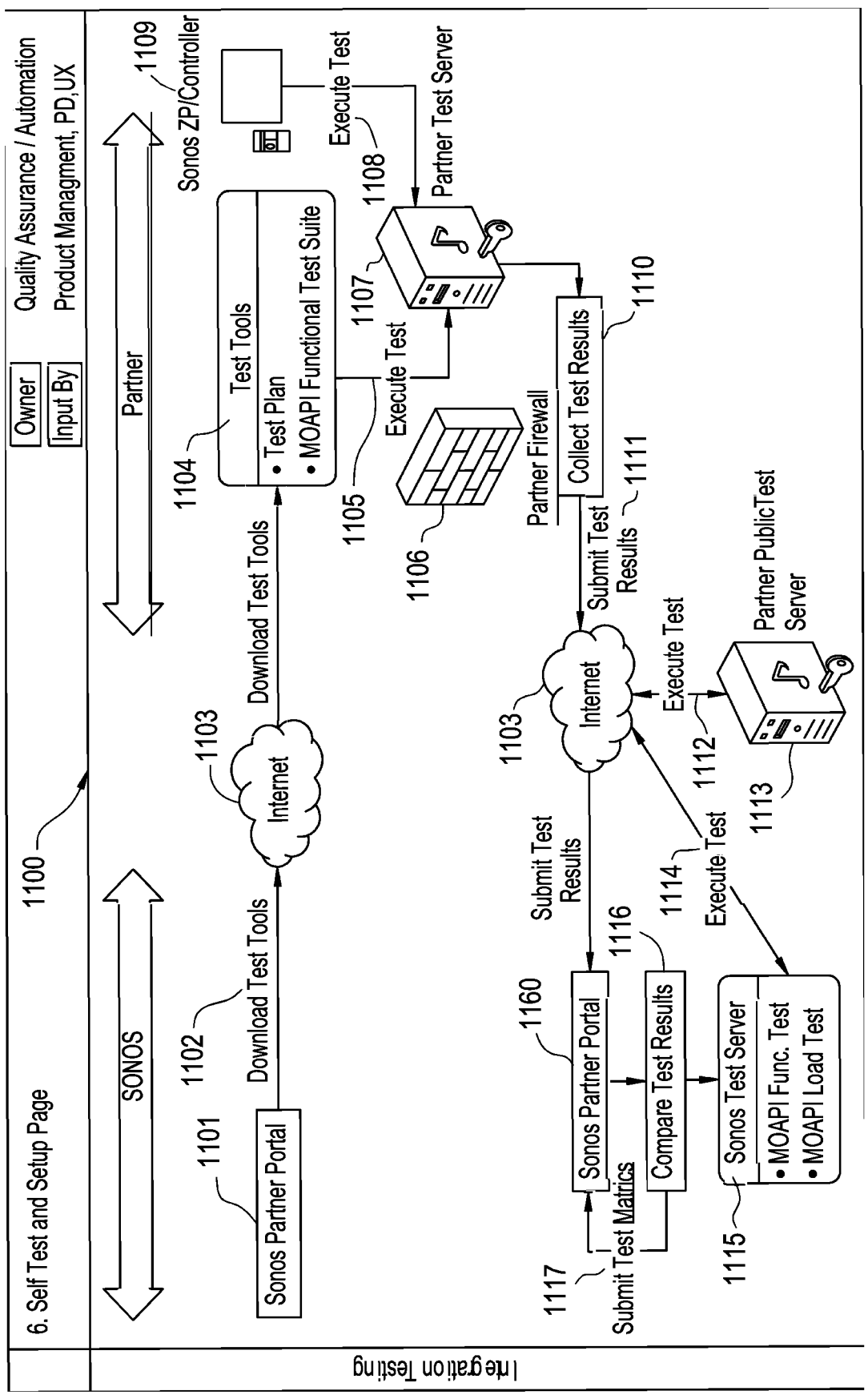
FIG. 11 illustrates an example integration testing system and associated process flow.

FIG. 11 illustrates an example integration testing system and associated process flow 1100. As shown in FIG. 11, a partner portal 1101 may be accessed to, at 1102, download test tools 1104 via the Internet 1103 or other network. The test tools 1104 may include test plan, API functional test suite, and so on. Using the test tools 1104, a test may be executed at 1105. The test may be executed via a partner firewall 1106 at a partner test server 1107, and/or a test may be executed, at 1108, using a zone player/controller configuration 1109, with results provided to the partner test server 1107. At block 1110, test results are collected, and, at 1111, test results are submitted via the Internet or other network 1103 to the partner portal 1101.

Alternatively or in addition, a test may be executed, at block 1112, at a partner public test server 1113 (e.g., an open beta). A test server 1115 may also be used to execute a test 1114, such as an API functional test, an API load test, and so on.

At block 1116, test results are compared, and, at 1117, test results are submitted to the partner portal 1101 for review (and further action).

Figure 12:
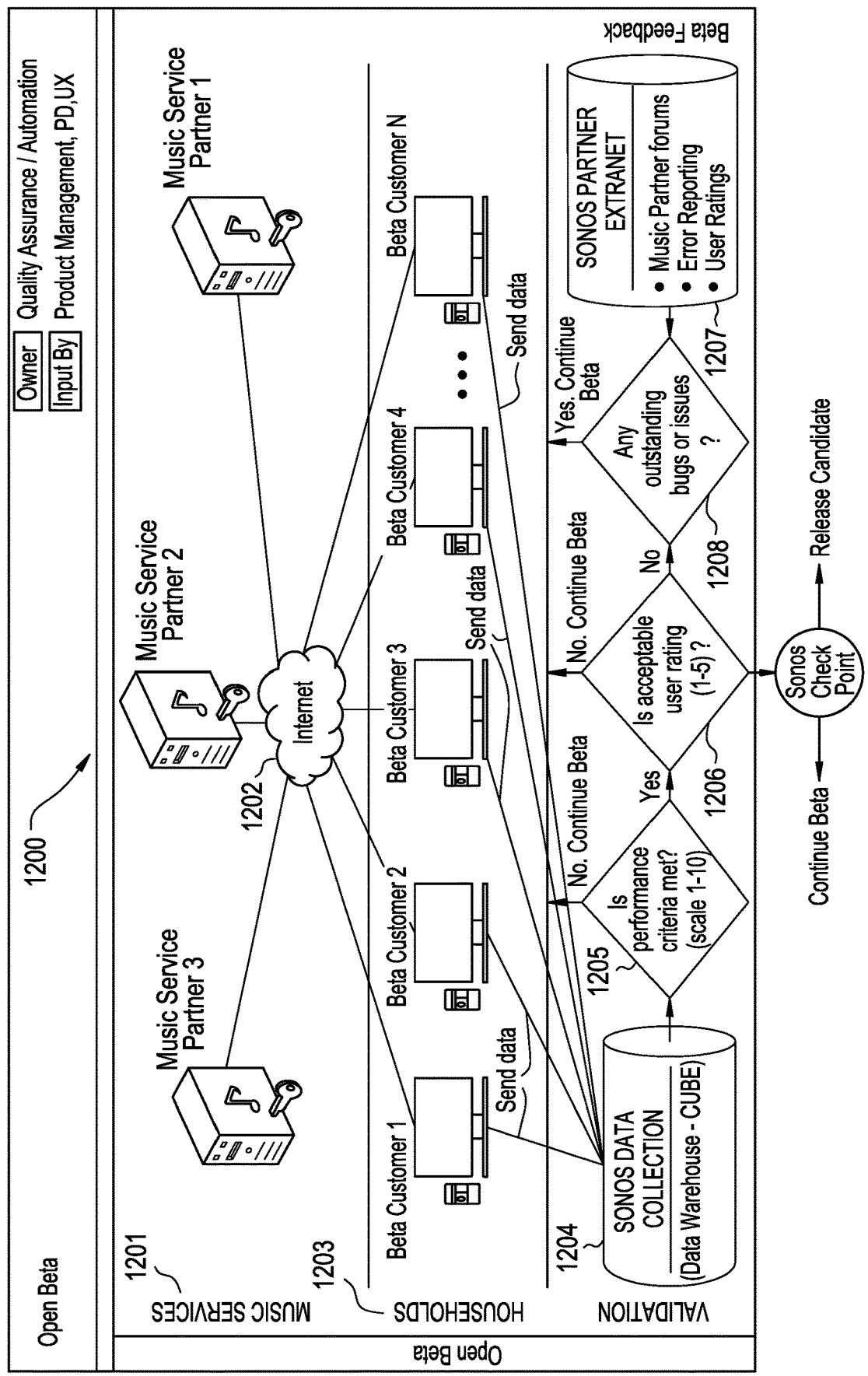
FIG. 12 provides an example infrastructure for open beta testing of content services.

FIG. 12 provides an example infrastructure 1200 for open beta testing of content services. One or more music services 1201, such as music service partners 1, 2, and 3 shown in FIG. 12, may access one or more households 1203, such as beta customers 1, 2, 3, 4, . . . . N, via the Internet 1202 or other network. Each beta customer 1203 sends data for validation to a data collection (e.g., a data warehouse) 1204.

The collected data is evaluated, at 1205, to determine whether one or more performance criterion is met. If the one or more performance criterion is not met, then the beta test continues with the customers 1203. If the one or more performance criterion is met, then, at 1206, the data is evaluated to determine whether the beta received an acceptable user rating. If the beta did not receive an acceptable user rating, then the beta continues. If an acceptable user rating was obtained, then the candidate is sent to a check point 1209. Additionally, beta feedback may be provided via a partner extranet 1207, including one or more music partner forums, error reporting, user rating, and so on. At 1208, outstanding bugs or issues are identified based on the partner extranet 1207 feedback. If outstanding bugs or issues have been identified, then the beta testing continues. If no outstanding bugs or issues have been identified, then the candidate is sent to the check point 1209.

At the check point 1209, data collected during the for the service candidate beta is evaluated to determine whether beta testing should continue or the candidate should be released to general availability.

FIG. 13 illustrates an example music service performance feedback dashboard 1300. A partner may obtain information for one or more services 1301 regarding performance rating 1302, user rating 1303, and identified issues 1304. The feedback may be used for further modification, testing, or approval of the service and may update as beta testing continues, for example.

Using the systems and methods described above, content services may be developed, validated, beta tested by real customers, and integrated with a content delivery platform. Certain embodiments offer an open web-services API that provides an easy way for content to be delivered by web-based streaming music services and consumed by a content delivery system, such as the SONOS™ Multi-Room Music System. The API is designed to support a range of content providers, including on-demand music services as well as Internet radio streaming. In certain embodiments, the API is not designed for downloading music and saving onto a local hard drive or other storage; instead the API is designed with a focus on streaming media across playback devices that do not contain large amounts of internal storage, for example.

In certain embodiments the API web service specification is built using the SOAP 1.2 specification and defines methods to browse and play music from a music service. A SOAP message including an envelope containing an optional header and a required body. The header contains blocks of information relevant to how the message is to be processed. This includes routing and delivery settings, authentication or authorization assertions, and transaction contexts. The body contains the actual message to be delivered and processed. In the example API, the SOAP headers are used for passing in user credentials.

Web Services Description Language (WSDL) is an XML grammar for describing network services as collections of communication endpoints capable of exchanging messages. In certain embodiments, the physical specification for the API is given as a WSDL document and an XML Schema Definition (XSD) document. The WSDL+XSD documents provide an unambiguous definition for all methods and data types in the API, and have an additional benefit of being machine-readable by several popular code generation tools.

In certain embodiments, error handling in the API is done via standard SOAP 1.1 faults, specifically via the SOAP <faultcode> element. The API may define a set of predefined fault codes, for example.

In certain embodiments, the API provides core services for four areas of media consumption: 1) Authentication, 2) Browsing and Search, 3) Audio Playback, and 4) User Customization. Certain optional services may also be provided.

c. Example Authentication Service

Figure 14:
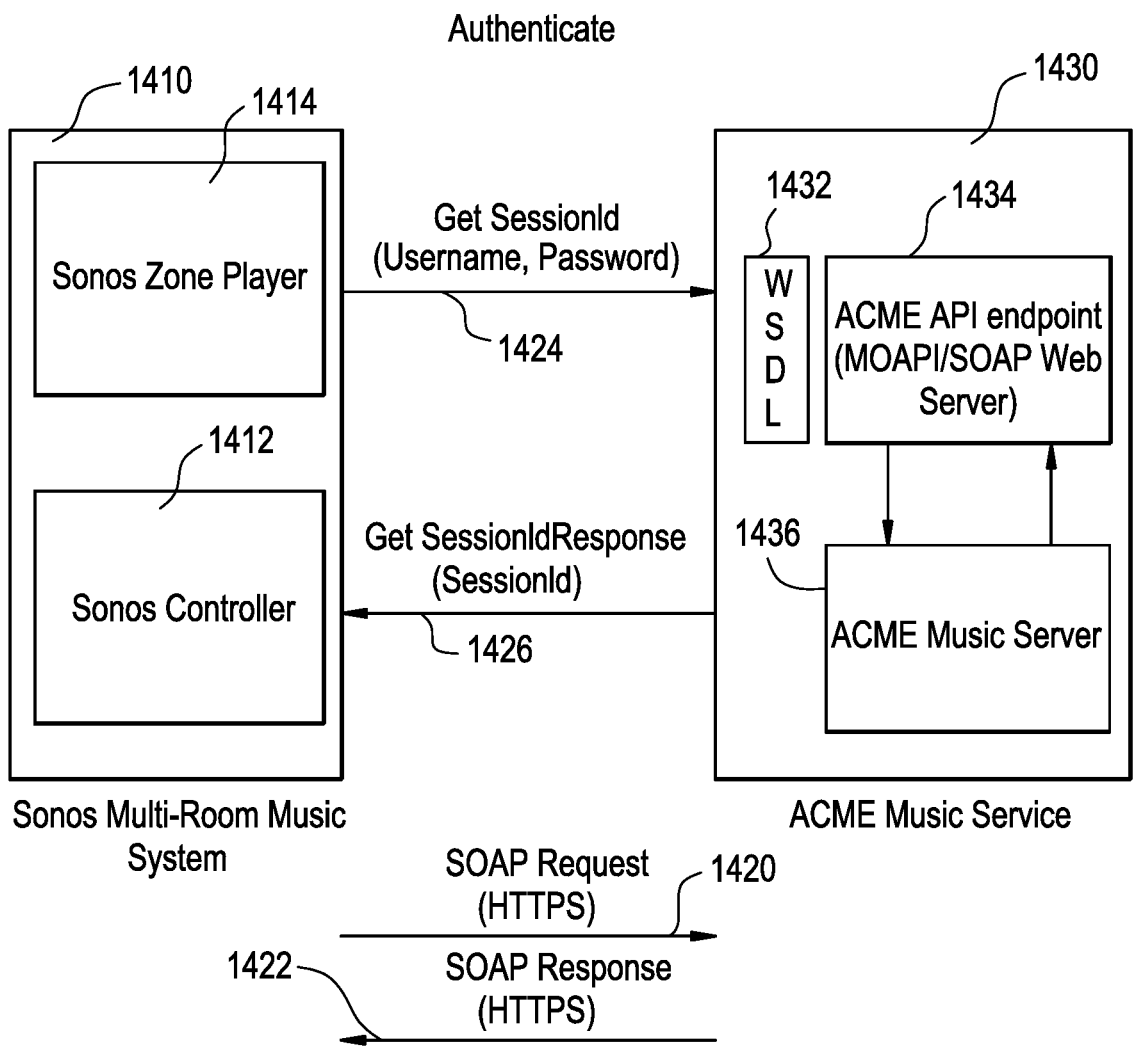
FIG. 14 illustrates an example authentication service.

FIG. 14 illustrates an example authentication service. Most service providers require a username and password to access their content hierarchy or streams. In certain embodiments, the services API provides a way for devices to authenticate via username/password. Furthermore, a unique device-specific identifier (such as its Media Access Control (MAC) address) is passed between the device and service, in case the service wants to enforce any per-device business rules.

In order to avoid overhead associated with maintaining server state, each API/SOAP request that requires user authorization carries credential information. Each API/SOAP request includes a SOAP header element with end-user credentials. Because some service providers cannot resolve username and password credentials efficiently, the API also supports a tokenized form for credential information. A separate API/SOAP request is made to translate a username/password pair into an opaque token called "sessionId".

Authentication is implemented by the getSessionId method or, alternatively, can be implemented by passing in credentials with HTTP headers, for example.

Thus, authentication may be facilitated between a music system 1410 including at least one controller 1412 and at least one zone player 1414 and a music service 1430 via a SOAP request 1420, a SOAP response 1422, getSessionId (Username, Password) 1424, and getSessionIdResponse (sessionId) 1426 via a WSDL 1432 and API endpoint (e.g., an API/SOAP Web Server) 1434 associated with a music server 1436.

f. Example Browse and Search Services

Consumers like to explore content by artist, genre, etc. As such, in certain embodiments, the API allows music services to provide browsing based on metadata like artists, albums, composers, playlists, genres, programmed stations, and tracks. Service providers may add their own browse hierarchy to allow consumers to explore the editorial content, such as Top 100s, and the like.

The web services API allows service providers to tailor and dynamically change the content hierarchy that they present. This capability allows the service provider, the partner, to present different content based on business rules, geography or user experience on the affected device, for example.

In certain embodiments, in the API, the service provider is responsible for sorting elements within the hierarchy, e.g., alphabetically or by some computed relevance. However the service chooses to sort elements, the sort order should be consistent and understandable to the user of the streaming device.

In certain embodiments, browse and search calls may be structured to allow incremental browsing. This is to better support devices with low memory footprints. For example, when a device performs a search for all albums containing the string "Hits", the call also specifies a desired starting index and count for the search results (e.g., "search all tracks for 'hits' and return 20 results starting at the 100th result").

In certain embodiments, browsing is implemented by the getMetadata, getMediaMetadata and getLastUpdate methods. The API also supports optional search and alphabetical scrolling functionality. Search is implemented by the search method and uses letter by letter search. Alphabetical scrolling is implemented by the getScrollIndices method.

In certain embodiments, a client device using the API invokes the getMediaURI method to obtain the playback URL of a track given a track identifier (ID). This method is called on a secure endpoint using secure sockets layer (SSL), and returns a secure hypertext transfer protocol (HTTPS) URL for the track.

In certain embodiments, the API does not constrain implementers to use any particular protocol. In certain embodiments, the only requirement is that getMediaURI provide content that can be streamed in a form recognized by the device, for example. The API implementations have been built with streaming via HTTP and multimedia messaging service (MMS), for example.

In certain embodiments, the API is agnostic about the transport used for delivering content, and about how the content is encoded. Content may be delivered as MP3s using HTTP streaming, as Microsoft WINDOWS™ Media Audio using MMS, etc.

Content providers may want to allow users to customize their content, such as allowing the creation of custom playlists. In certain embodiments, the API supports this with general "item" management functions. Customization is implemented by the createItem and deleteItem methods, for example.

In certain embodiments, optional services may include 1) Favorites, 2) Alphabetical Scrolling, 3 Status Reporting, 4) Extended Metadata, and 5) Track Ratings, for example.

In certain embodiments, a service provider may have some mechanism for users to add artists, albums or tracks to a special "favorites" collection. If a favorite's collection is exposed to the device, the service provider must implement these methods. Favorites are implemented by the createItem, and deleteItem methods, for example.

In certain embodiments, alphabetical scrolling is a technique that optimizes content enumeration for large collections of metadata. It allows a user to scroll through the alphabet to select a letter, which can then initiate a getMetadata request on a collection at a particular index, for example. If a service provider wishes to provide this capability for large lists of items, it may implement these methods. Alphabetical Scrolling is implemented by the getScrollIndices method, for example.

In certain embodiments, service providers may want to collect statistics or improve quality of service by being notified when streaming failures occur. A service provider may implement these methods if they desire such feedback from devices. Status Reporting is implemented by the reportStatus and setPlayedSeconds methods, for example.

In certain embodiments, a service provider may expose additional metadata about a track, artist, album, or station, which can be used by the client to create a richer browsing experience for the user. Extended Metadata is implemented by the getExtendedMetadata and getExtendedMetadataText methods.

In certain embodiments, music services may decide what, if any, extra information view items they wish to present. In general, the information view items fall into three categories: 1) Text information about an artist, album or track. Examples include album reviews, artist biographies and tour dates. 2) Additional music browsing within the music service taking the selected content as the starting point. For example, the information may be provided to find artists who are similar or have influenced the selected artist. 3) Library actions based on the selected track, album or artist. For example, information may be provided to "Add track to Library" or "Delete Album from library".

In certain embodiments, a service provider may allow the client to apply a rating to a track. The value of the rating is represented via the API simply as an integer, which has no inherent semantic meaning. It is up to the service and client to define and agree upon the meaning of each particular "rating value", and behave accordingly. Track Ratings is implemented by the rateItem method, for example.

Figure 15:
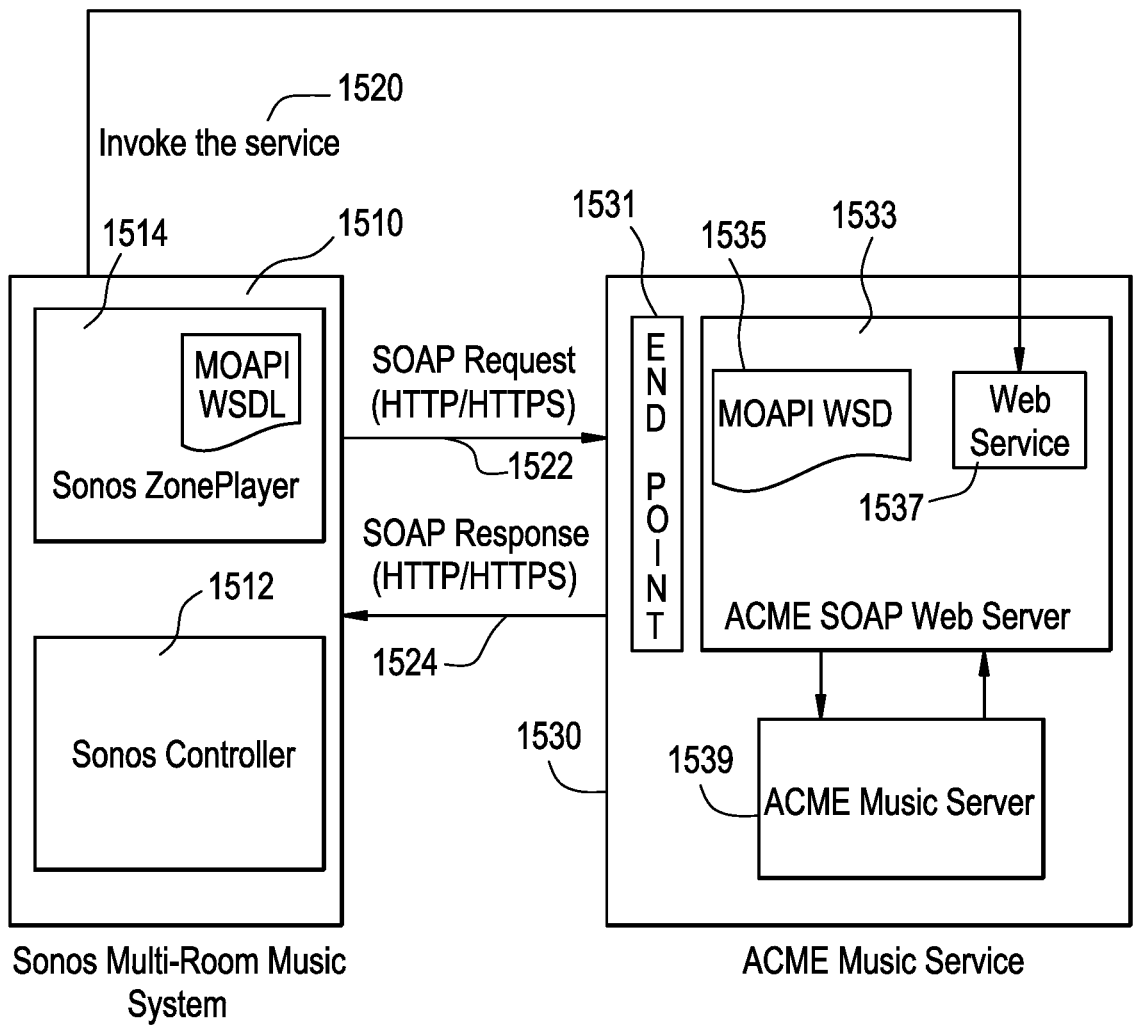
FIG. 15 illustrates an example integration of a music system with a music service.

FIG. 15 illustrates an example integration 1500 of the SONOS™ Multi-Room Music System 1510 with an ACME Music Service (AMS) 1530, which provides an endpoint 1531 to a SOAP web server 1533 running Sonos API services 1537 as shown in FIG. 15. The sequence diagram of FIG. 15 shows a SOAP API request 1522 and a SOAP response message 1524 between the music system 1510 and the AMS 1530 for various music operations.

The music system 1510 may invoke 1520 a web service 1537 at the music service's 1530 web server 1533. Music system 1510 components (Zone Player 1514 and Controller 1512) call the AMS 1530 using SOAP over HTTP and HTTPS 1522. The API 1535 makes use of SOAP header blocks to present user credentials when applicable. When user credentials are required by an API, the HTTPS transport is used, otherwise the HTTP transport is used. For example, browsing of the entire content hierarchy from AMS does not require any user login or authentication whereas enumeration of the user "favorites" directory would require valid credentials.

Figure 16:
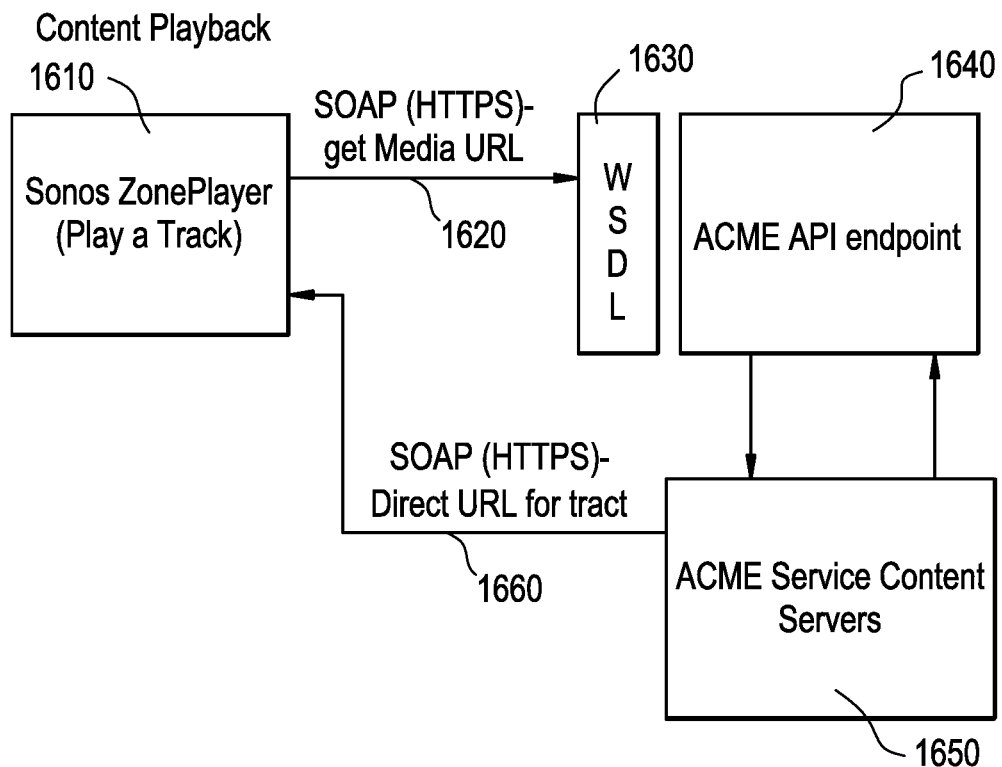
FIG. 16 illustrates an example system and sequence diagram for content playback.

FIG. 16 illustrates an example system and sequence diagram for content playback. As shown in FIG. 16, a zone player 1610 receives a request to play an audio track. The player 1610 uses a message (e.g., an HTTPS SOAP message) 1620 to get a uniform resource indicator (UIR) for the media file via a WSDL 1630 and a music service API endpoint 1640. The WSDL 1630 formats the request for the API endpoint 1640, which communicates with one or more service content servers 1650 to locate the media. The server 1650 provides a location for the track via a return message 1660.

Figure 17:
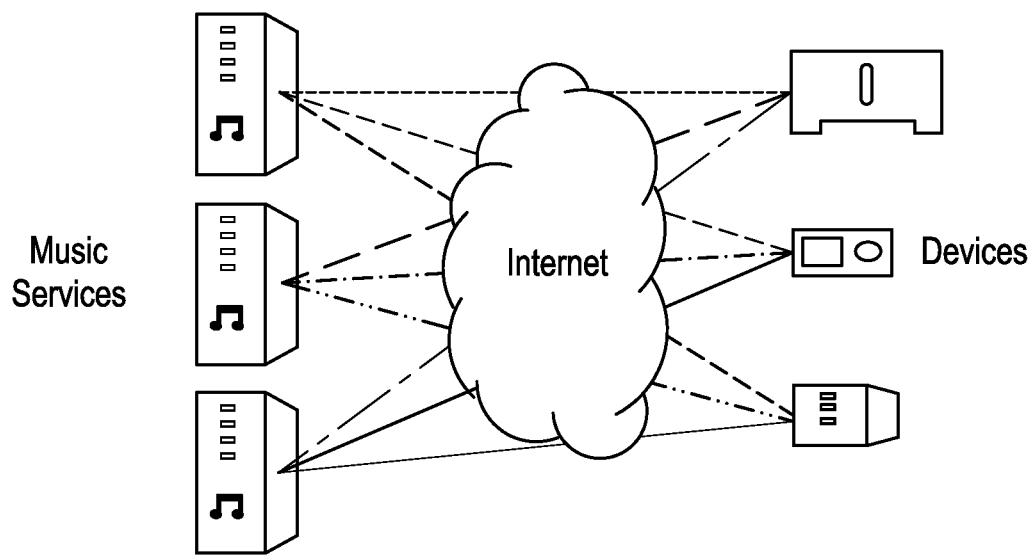
FIGS. 17 and 18 depict example interactions between music services and playback devices.

As illustrated, for example, in FIG. 17, prior interaction between music services 1710 and playback devices 1730 over a network such as the Internet 1720 suffered from device 1730 incompatibility, resulting in the use of one API 1740-1748 to provide content from each service 1710 to each device 1730.

Figure 18:
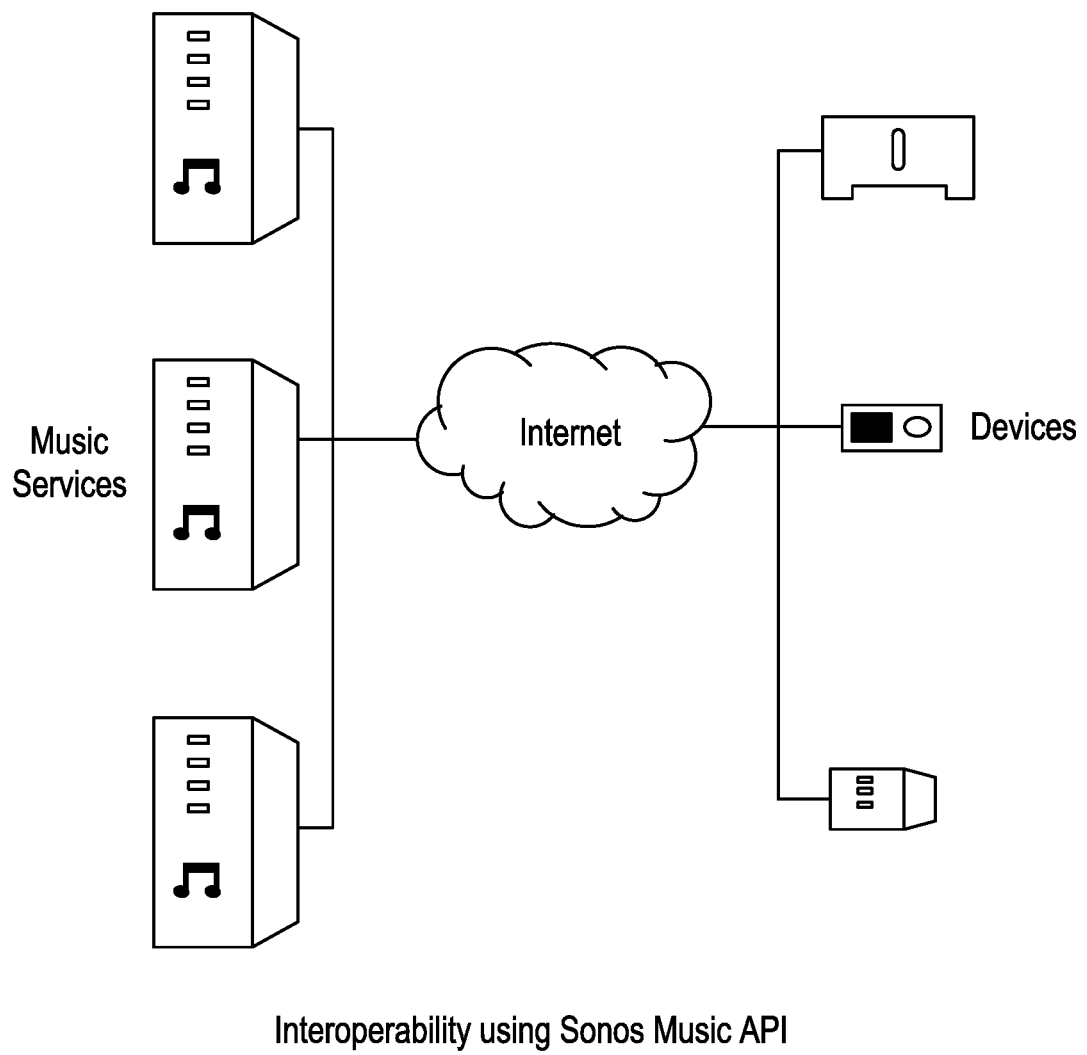

As illustrated, for example, in FIG. 18, certain embodiments facilitate interoperability through provided resources, guidelines, APIs, and testing to facilitate better interaction between music services 1810 and playback devices 1830 over a network such as the Internet 1820. In the example of FIG. 18, a common music API 1840 is used to facilitate communication and interoperability among all connected services 1810 and devices 1830 to provide and share content.

Figures described above (such as at least FIGS. 7, 8, 10-12, and 14-16) depict example flow diagrams representative of process(es) that may be implemented using, for example, computer readable instructions that may be used to develop, evaluate, beta test, approve, and release new multimedia content for access and playback via a zone player and/or other playback device. The example process(es) may be performed using a processor, a controller and/or any other suitable processing device. For example, the example process(es) may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process(es) may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example process(es) may be implemented using any combination(s) of application specific integrated circuit(s) (ASIC(s)), programmable logic device(s) (PLD(s)), field programmable logic device(s) (FPLD(s)), discrete logic, hardware, firmware, and so on. Also, some or all of the example process(es) may be implemented manually or as any combination(s) of any of the foregoing techniques, for example, any combination of firmware, software, discrete logic and/or hardware. Further, although the example process(es) are described with reference to the flow diagrams of FIGS. 7, 8, 10-12, and 14-16, other methods of implementing the process(es) may be employed. For example, the order of execution of the blocks may be changed, and/or some of the blocks described may be changed, eliminated, sub-divided, or combined. Additionally, any or all of the example process(es) may be performed sequentially and/or in parallel by, for example, separate processing threads, processors, devices, discrete logic, circuits, and so on.

VII. Example Processing System

Figure 19:
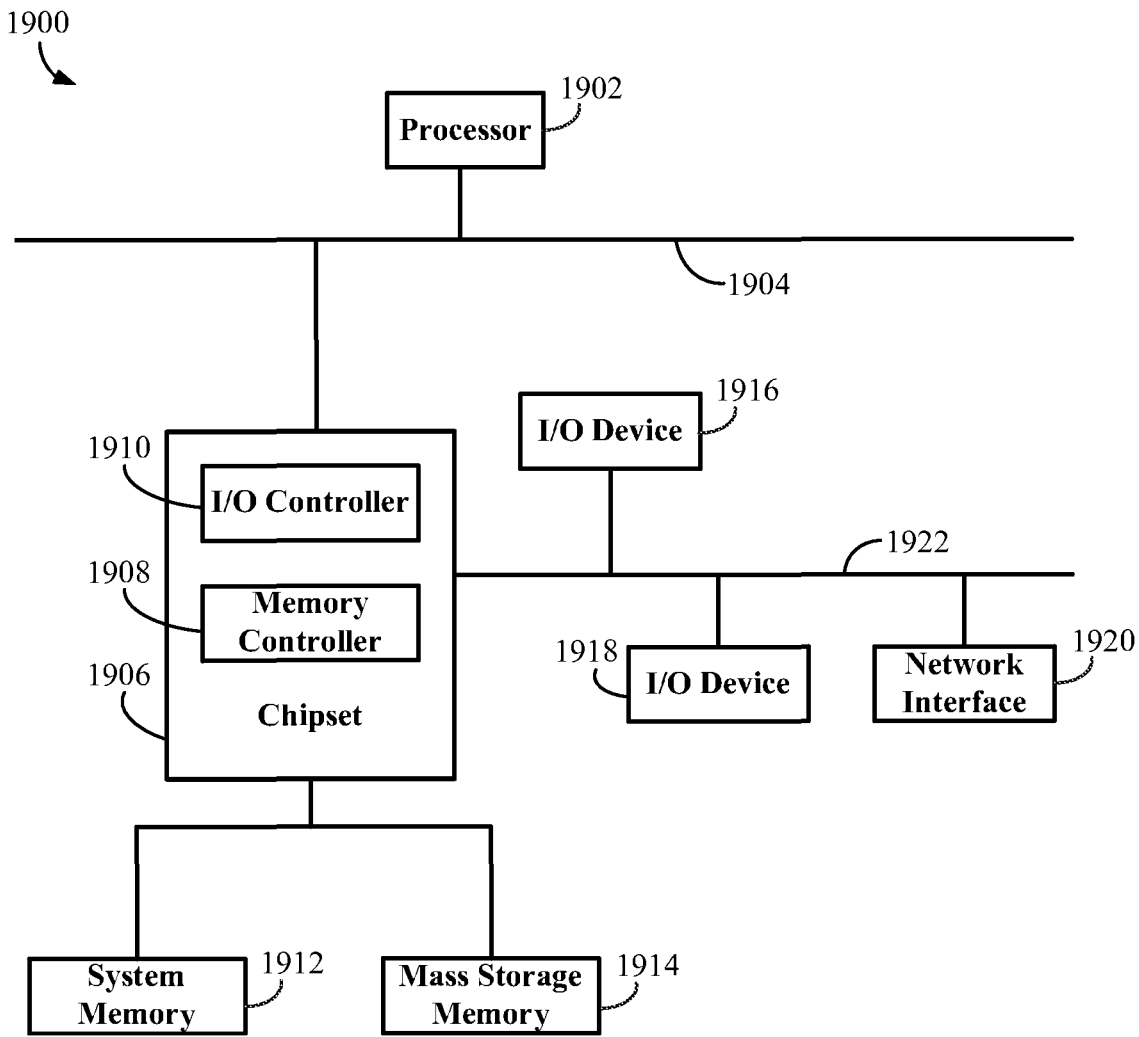
FIG. 19 is a block diagram of an example processor system that may be used to implement the systems, apparatus, articles of manufacture, and methods described herein.

FIG. 19 is a block diagram of an example processor system 1900 that may be used to implement the systems, apparatus, articles of manufacture, and methods described herein. The processor system 1900 may be included in, be used to implement, be used to control, and/or be used to provide information to one or more of the processes, systems, and configurations described above. As shown in FIG. 19, the processor system 1900 includes a processor 1902 that is coupled to an interconnection bus 1904. The processor 1902 may be any suitable processor, processing unit or microprocessor. Although not shown in FIG. 19, the system 1900 may be a multi-processor system and, thus, may include one or more additional processors that are identical or similar to the processor 1902 and that are communicatively coupled to the interconnection bus 1904.

The processor 1902 of FIG. 19 is coupled to a chipset 1906, which includes a memory controller 1908 and an input/output (I/O) controller 1910. As is well known, a chipset typically provides input/output (I/O) and memory management functions as well as a plurality of general purpose and/or special purpose registers, timers, etc. that are accessible or used by one or more processors coupled to the chipset 1906. The memory controller 1908 performs functions that enable the processor 1902 (or processors if there are multiple processors) to access a system memory 1912 and a mass storage memory 1914.

The system memory 1912 may include any desired type of volatile and/or non-volatile memory such as, for example, static random access memory (SRAM), dynamic random access memory (DRAM), flash memory, read-only memory (ROM), etc. The mass storage memory 1914 may include any desired type of mass storage device including hard disk drives, optical drives, tape storage devices, etc.

The I/O controller 1910 performs functions that enable the processor 1902 to communicate with peripheral I/O devices 1916 and 1918 and a network interface 1920 via an I/O bus 1922. The I/O devices 1916 and 1918 may be any desired type of I/O device such as, for example, a keyboard, a video display or monitor, a mouse, etc. The network interface 1920 may be, for example, an Ethernet device, an asynchronous transfer mode (ATM) device, an 802.11 device, a DSL modem, a cable modem, a cellular modem, etc. that enables the processor system 1900 to communicate with another processor system.

While the memory controller 1908 and the I/O controller 1910 are depicted in FIG. 19 as separate blocks within the chipset 1906, the functions performed by these blocks may be integrated within a single semiconductor circuit or may be implemented using two or more separate integrated circuits.

VIII. Conclusion

The example embodiments described herein provide for systems and methods to integrate music provider services with platforms and systems for content distribution and playback. Technology from the example embodiments may be used in any application where accurately reproduced sound is desired, such as in buildings, motorized vehicles, boats, airplanes, and in outdoor locations.

Certain embodiments provide a system including a web-based media content development platform and content delivery platform, the platforms including a processor and a memory. The example development platform is arranged to provide an interface to accept media content from a provider for certification. The example development platform is arranged to facilitate self-test of the media content by the provider via the interface according to testing tools and an application programming interface provided in conjunction with the development platform. The example development platform is arranged to process the media content for monitored beta test by a group of users via the content delivery platform. The example development platform is arranged to evaluate the monitored beta test to determine suitability of the media content for release. The example development platform is arranged to facilitate release of the media content for general availability via the content delivery platform.

Certain embodiments provide a computer-implemented method including providing, via a web-based media content development platform, an interface to accept media content from a provider for certification. The example method includes facilitating self-test of the media content by the provider via the interface according to testing tools and an application programming interface provided in conjunction with the development platform. The example method includes processing the media content for monitored beta test by a group of users via a content delivery platform. The example method includes evaluating the monitored beta test to determine suitability of the media content for release. The example method includes facilitating release of the media content for general availability via the content delivery platform.

Certain examples provide a computer readable storage medium including instructions for execution by a processor, the instructions, when executed by the processor, to implement a system for web-based content development and deployment. The example system includes a web-based media content development platform and content delivery platform, the platforms including a processor and a memory. The example development platform is arranged to provide an interface to accept media content from a provider for certification. The example development platform is arranged to facilitate self-test of the media content by the provider via the interface according to testing tools and an application programming interface provided in conjunction with the development platform. The example development platform is arranged to process the media content for monitored beta test by a group of users via the content delivery platform. The example development platform is arranged to evaluate the monitored beta test to determine suitability of the media content for release. The example development platform is arranged to facilitate release of the media content for general availability via the content delivery platform.

The components, elements, and/or functionality of the systems discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a processing device, such as a controller and/or playback device.

Various inventions have been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the embodiments have applicability well beyond such embodiment, which can be appreciated by those skilled in the art. Accordingly, the scope of the present invention is defined by the claims rather than the forgoing description of embodiments.

The invention claimed is:

1. A controller device comprising:
   a network interface;
   a user interface;
   at least one processor;
   at least one non-transitory computer-readable medium, wherein the at least one non-transitory computer-readable medium is provisioned with program instructions that are executable by the at least one processor to cause the controller device to:
      communicate, via the network interface, with (i) at least one playback device or that is included in an audio playback system, wherein the audio playback system also that includes the controller device and (ii) a plurality of remote computing devices each associated with a respective music service;
      transmit, to a first remote computing device associated with a first music service, a request for a session token that is to be used for identifying the audio playback system when communicating with the first music service to access music content provided by the first music service for playback at the audio playback system;
      receive, from the first remote computing device associated with the first music service, a first session token for authenticating communications from the audio playback system to the first music service;
      receive, via the user interface, first user input indicating a music content query for music content that is to be played back by the at least one playback device;
      based on the first user input, transmit a request comprising the first session token and a respective identifier associated with the at least one playback device to the first remote computing device to perform a search in accordance with the music content query and one or more characteristics of the at least one playback device;
      based on the search, present, via the user interface, a plurality of indications corresponding to respective music content provided by the first music service that are available for playback by the at least one playback device;
      receive, via the user interface, second user input indicating selection of a given indication corresponding to given music content provided by the first music service; and
      based on (i) the second user input and (ii) a respective identifier for the given music content, cause the at least one playback device to play back the given music content.

2. The controller device of claim 1, wherein:
   the program instructions that are executable by the at least one processor to cause the controller device to transmit the request for the session token comprise program instructions that are executable by the at least one processor to cause the controller device to:
      transmit, to the first remote computing device associated with the first music service, a first session identifier request comprising account information related to the first music service; and
   the program instructions that are executable by the at least one processor to cause the controller device to receive the first session token comprise program instructions that are executable by the at least one processor to cause the controller device to:
      receive, from the first remote computing device associated with the first music service, a first access credential.

3. The controller device of claim 2, wherein the first access credential is a first time-dependent token.

4. The controller device of claim 1, wherein the at least one non-transitory computer-readable medium is also provisioned with program instructions that are executable by the at least one processor to cause the controller device to:
   based on receiving the first session token, add the first music service to the audio playback system.

5. The controller device of claim 4, wherein the program instructions that are executable by the at least one processor to cause the controller device to add the first music service to the audio playback system comprise program instructions that are executable by the at least one processor to cause the controller device to:
   cause the audio playback system to store a first access credential for the first music service.

6. The controller device of claim 1, wherein the at least one non-transitory computer-readable medium is also provisioned with program instructions that are executable by the at least one processor to cause the controller device to:
   transmit, to a second remote computing device associated with a second music service, a request for a session token that is to be used for identifying the audio playback system when communicating with the second music service to access music content provided by the second music service for playback at the audio playback system;
   receive, from the second remote computing device associated with the second music service, a second session token for authenticating communications from the audio playback system to the second music service; and based on the first user input, transmit a third request comprising the second session token and the respective identifier associated with the at least one playback device to the second remote computing device to perform a search in accordance with the music content query and one or more characteristics of the at least one playback device, wherein the plurality of indications include indications corresponding to respective music content provided by the second music service that are available for playback by the at least one playback device.

7. The controller device of claim 1, wherein the program instructions that are executable by the at least one processor to cause the controller device to cause the at least one playback device to play back the given music content comprise program instructions that are executable by the at least one processor to cause the controller device to:
   transmit, to the at least one playback device, a playback command comprising the respective identifier for the given music content.

8. The controller device of claim 1, wherein the program instructions that are executable by the at least one processor to cause the controller device to cause the at least one playback device to play back the given music content comprise program instructions that are executable by the at least one processor to cause the controller device to:
   cause the at least one playback device to obtain the respective identifier for the given music content from the first music service.

9. The controller device of claim 1, wherein:
   the at least one playback device comprises a first playback device and a second playback device that are grouped for synchronous playback of audio content; and
   the program instructions that are executable by the at least one processor to cause the controller device to cause the at least one playback device to play back the given music content comprise program instructions that are executable by the at least one processor to cause the controller device to:
      cause the first playback device and the second playback device to play back the given music content in synchrony.

10. The controller device of claim 1, wherein the first remote computing device associated with the first music service comprises a web server associated with the first music service.

11. At least one non-transitory computer-readable medium, wherein the at least one non-transitory computer-readable medium is provisioned with program instructions that, when executed by at least one processor, cause a controller device to:
   communicate, via the network interface, with (i) at least one playback device that is included in an audio playback system, wherein the audio playback system also includes the controller device and (ii) a plurality of remote computing devices each associated with a respective music service;
   transmit, to a first remote computing device associated with a first music service, a request for a session token that is to be used for identifying the audio playback system communicating with the first music service to access music content provided by the first music service for playback at the audio playback system;
   receive, from the first remote computing device associated with the first music service, a first session token for authenticating communications from the audio playback system to the first music service;
   receive, via the user interface, first user input indicating a music content query for music content that is to be played back by the at least one playback device;
   based on the first user input, transmit a request comprising the first session token and a respective identifier associated with the at least one playback device to the first remote computing device to perform a search in accordance with the music content query and one or more characteristics of the at least one playback device;
   based on the search, present, via the user interface, a plurality of indications corresponding to respective music content provided by the first music service that are available for playback by the at least one playback device;
   receive, via the user interface, second user input indicating selection of a given indication corresponding to given music content provided by the first music service; and
   based on (i) the second user input and (ii) a respective identifier for the given music content, cause the at least one playback device to play back the given music content.

12. The at least one non-transitory computer-readable medium of claim 11, wherein:
   the program instructions that, when executed by at least one processor, cause the controller device to transmit the request for the session token comprise program instructions that, when executed by at least one processor, cause the controller device to:
      transmit, to the first remote computing device associated with the first music service, a first session identifier request comprising account information related to the first music service; and
   the program instructions that, when executed by at least one processor, cause the controller device to receive the first session token comprise program instructions that, when executed by at least one processor, cause the controller device to:
      receive, from the first remote computing device associated with the first music service, a first access credential.

13. The at least one non-transitory computer-readable medium of claim 12, wherein the first access credential is a first time-dependent token.

14. The at least one non-transitory computer-readable medium of claim 11, wherein the at least one non-transitory computer-readable medium is also provisioned with program instructions that, when executed by at least one processor, cause the controller device to:
   based on receiving the first session token, add the first music service to the audio playback system.

15. The at least one non-transitory computer-readable medium of claim 14, wherein the program instructions that, when executed by at least one processor, cause the controller device to add the first music service to the audio playback system comprise program instructions that, when executed by at least one processor, cause the controller device to:
   cause the audio playback system to store a first access credential for the first music service.

16. The at least one non-transitory computer-readable medium of claim 11, wherein the at least one non-transitory computer-readable medium is also provisioned with program instructions that, when executed by at least one processor, cause the controller device to:
   transmit, to a second remote computing device associated with a second music service, a request for a session token that is to be used for identifying the audio playback system when communicating with the second music service to access music content provided by the second music service for playback at the audio playback system;

receive, from the second remote computing device associated with the second music service, a second session token for authenticating communications from the audio playback system to the second music service; and based on the first user input, transmit a third request comprising the second session token and the respective identifier associated with the at least one playback device to the second remote computing device to perform a search in accordance with the music content query and one or more characteristics of the at least one playback device, wherein the plurality of indications include indications corresponding to respective music content provided by the second music service that are available for playback by the at least one playback device.

17. A method carried out by a controller device, the method comprising:

communicating, via a network interface, with (i) at least one playback device that is included in an audio playback system, wherein the audio playback system also includes the controller device and (ii) a plurality of remote computing devices each associated with a respective music service;

transmitting, to a first remote computing device associated with a first music service, a request for a session token that is to be used for identifying the audio playback system when communicating with the first music service to access music content provided by the first music service for playback at the audio playback system;

receiving, from the first remote computing device associated with the first music service, a first session token for authenticating communications from the audio playback system to the first music service;

receiving, via a user interface, first user input indicating a music content query for music content that is to be played back by the at least one playback device;

based on the first user input, transmitting a request comprising the first session token and a respective identifier associated with the at least one playback device to the first remote computing device to perform a search in accordance with the music content query and one or more characteristics of the at least one playback device;

based on the search, presenting, via the user interface, a plurality of indications corresponding to respective music content provided by the first music service that are available for playback by the at least one playback device;

receiving, via the user interface, second user input indicating selection of a given indication corresponding to given music content provided by the first music service; and based on (i) the second user input and (ii) a respective identifier for the given music content, causing the at least one playback device to play back the given music content.

18. The method of claim 17, wherein:

transmitting the request for the session token comprises transmitting, to the first remote computing device associated with the first music service, a first session identifier request comprising account information related to the first music service; and receiving the first session token comprises receiving, from the first remote computing device associated with the first music service, a first access credential.

19. The method of claim 18, wherein the first access credential is a first time-dependent token.

20. The method of claim 17, further comprising:

based on receiving the first session token, adding the first music service to the audio playback system.

21. The controller device of claim 1, wherein the one or more characteristics of the at least one playback device indicate one or more of (i) a device-specific rule implemented by the first music service, (ii) a geographical characteristic associated with the at least one playback device, or (iii) a listening history associated with the at least one playback device.

* * * * *